United States Patent
Saquib

(10) Patent No.: US 11,450,084 B2
(45) Date of Patent: Sep. 20, 2022

(54) DATA FUSION ON TARGET TAXONOMIES

(71) Applicant: Goodrich Corporation, Charlotte, NC (US)

(72) Inventor: Suhail Shabbir Saquib, Shrewsbury, MA (US)

(73) Assignee: Goodrich Corporation, Charlotte, NC (US)

( * ) Notice: Subject to any disclaimer, the term of this patent is extended or adjusted under 35 U.S.C. 154(b) by 757 days.

(21) Appl. No.: 16/410,035

(22) Filed: May 13, 2019

(65) Prior Publication Data

US 2022/0215663 A1 Jul. 7, 2022

(51) Int. Cl.
| | |
|---|---|
| *G06V 10/20* | (2022.01) |
| *G06N 7/00* | (2006.01) |
| *G06K 9/62* | (2022.01) |
| *G06N 5/04* | (2006.01) |
| *G06V 20/10* | (2022.01) |
| *G06V 20/52* | (2022.01) |

(52) U.S. Cl.
CPC ......... *G06V 10/255* (2022.01); *G06K 9/6278* (2013.01); *G06N 5/04* (2013.01); *G06N 7/005* (2013.01); *G06V 20/176* (2022.01); *G06V 20/52* (2022.01)

(58) Field of Classification Search
None
See application file for complete search history.

(56) References Cited

U.S. PATENT DOCUMENTS

| | | |
|---|---|---|
| 5,963,653 A | 10/1999 | McNary et al. |
| 9,299,010 B2 | 3/2016 | Sathyendra et al. |
| 2007/0156617 A1 | 7/2007 | Szummer et al. |
| 2008/0162389 A1 | 7/2008 | Aboutalib |
| 2017/0161638 A1 | 6/2017 | Garagic et al. |
| 2019/0057285 A1* | 2/2019 | Hisada ................. G06K 9/6257 |

(Continued)

OTHER PUBLICATIONS

Mylonas, Phivos, Thanos Athanasiadis, and Yannis Avrithis. "Improving image analysis using a contextual approach." Proc. of 7th International Workshop on Image Analysis for Multimedia Interactive Services (WIAMIS), Seoul, Korea. 2006. (Year: 2006).*

(Continued)

*Primary Examiner* — Emily C Terrell
*Assistant Examiner* — Nathan J Bloom
(74) *Attorney, Agent, or Firm* — Locke Lord LLP; Joshua L. Jones; Scott D. Wofsy

(57) ABSTRACT

A method includes receiving a directive from a user to find an object in a geographical area, wherein the object is identified with an input label selected from a set of labels, obtaining sensor data in response to the directive for a real world physical object in the geographical area using one or more sensors, processing the sensor data with a plurality of automatic target recognition (ATR) algorithms to assign a respective ATR label from the set of labels and a respective confidence level to the real world physical object, and receiving modeled relationships within the set of labels using a probabilistic model based on a priori knowledge encoded in a set of model parameters. The method includes inferring an updated confidence level that the real world physical object actually corresponds to the input label based on the ATR labels and confidences and based on the probabilistic model.

19 Claims, 15 Drawing Sheets

(56) References Cited

U.S. PATENT DOCUMENTS

| | | | |
|---|---|---|---|
| 2020/0151899 A1* | 5/2020 | Suzuki | G06N 20/00 |
| 2020/0184623 A1* | 6/2020 | Price | G06T 3/60 |
| 2021/0142097 A1* | 5/2021 | Zheng | G06V 10/454 |
| 2021/0264226 A1* | 8/2021 | Lecue | G06F 16/9024 |

OTHER PUBLICATIONS

Extended European Search Report dated Jul. 15, 2020, issued during the prosecution of European Patent Application No. EP 19216291.5.

* cited by examiner

Fig. 12

| Input node | T17v1 | Tank | T52 | M2 | M2v1 | M2v2 |
|---|---|---|---|---|---|---|
| $P(Inputnode = 1)$ | 0.13 | 0.75 | 0.45 | 0.15 | 0.045 | 0.105 |
| $P(d|Inputnode = 1)$ | 0.91 | 0.65 | 0.12 | 0.96 | 0.97 | 0.85 |
| $P(Inputnode = 1|d)$ | 0.60 | 0.85 | 0.10 | 0.80 | 0.60 | 0.40 |
| $P(Tank = 1|d_1, \dots, d_n)$ | 0.88 | 0.94 | 0.92 | 0.45 | 0.08 | 0.06 |
| $P(Truck = 1|d_1, \dots, d_n)$ | 0.12 | 0.06 | 0.08 | 0.55 | 0.92 | 0.94 |
| $P(T17 = 1|d_1, \dots, d_n)$ | 0.63 | 0.66 | 0.82 | 0.40 | 0.07 | 0.05 |
| $P(T52 = 1|d_1, \dots, d_n)$ | 0.21 | 0.22 | 0.04 | 0.02 | 0.00 | 0.00 |
| $P(M2 = 1|d_1, \dots, d_n)$ | 0.07 | 0.04 | 0.05 | 0.53 | 0.92 | 0.94 |
| $P(T17v1 = 1|d_1, \dots, d_n)$ | 0.60 | 0.63 | 0.78 | 0.38 | 0.07 | 0.05 |
| $P(M2v1 = 1|d_1, \dots, d_n)$ | 0.02 | 0.01 | 0.01 | 0.16 | 0.86 | 0.66 |
| $P(M2v2 = 1|d_1, \dots, d_n)$ | 0.05 | 0.03 | 0.03 | 0.37 | 0.06 | 0.28 |

DATA FUSION ON TARGET TAXONOMIES

BACKGROUND OF THE INVENTION

1. Field of the Invention

The present disclosure relates to imaging systems, and more particularly to detection of real world physical objects in images.

2. Description of Related Art

In imaging to ascertain what objects are within a given geographic region, traditionally analysist had to review images manually and identified the objects in the images. For example, traditional analyst could review photographs of the ground taken from aircraft or satellite borne imaging systems. With the advent of Automatic Target Recognition (ATR) algorithms, which in other applications may take the form of facial recognition, for example, automated systems could reduce the work load of the analyst by pre-identifying certain objects in the images. For example, the analyst could use ATR on a set of images to obtain a count of vehicles from the images of a given geographic region. In the event that the confidence level was low in the ATR results, and in the event that the need to have a high confidence level was compelling, the analyst could direct physical assets to obtain more data, e.g. more or better images, of the geographic region. The additional data could be used to raise the confidence level in the ATR.

The conventional techniques have been considered satisfactory for their intended purpose. However, there is an ever present need for improved target recognition systems and methods. This disclosure provides a solution for this need.

SUMMARY OF THE INVENTION

A method includes receiving a directive from a user to find an object in a geographical area, wherein the object is identified with an input label selected from a set of labels, obtaining sensor data in response to the directive for a real world physical object in the geographical area using one or more sensors, processing the sensor data with a plurality of automatic target recognition (ATR) algorithms to assign a respective ATR label from the set of labels and a respective confidence level to the real world physical object, and receiving modeled relationships within the set of labels using a probabilistic model based on a priori knowledge encoded in a set of model parameters. The method includes inferring an updated confidence level that the real world physical object actually corresponds to the input label based on the ATR labels and confidences and based on the probabilistic model.

The directive can include a desired confidence level for the input label and the method can include comparing the desired confidence level to the updated confidence level. In the event that the updated confidence level is below the desired confidence level, the method can include directing or redirecting one or more physical assets to obtain further sensor data of the real world physical object. Obtaining, processing, receiving modeled relationships, and directing or redirecting can be performed by a non-human system to assist a human analyst. Directing or redirecting one or more physical assets can include surveillance activities such as following movement of the real world physical object. Directing or redirecting one or more physical assets can include moving an imaging device on a gimbal, routing an aircraft, moving a forward observer on the ground, and/or routing or controlling a space borne sensor system. The method can include, in the event that the updated confidence level is above the desired confidence level, targeting the real world physical object with a munition.

Modeling can include transforming a taxonomy tree of the set of labels into a complete graph with forward and reverse links between siblings and parents in the taxonomy tree. Inferring can include forming a reduced tree with the input label as a root and including all the ATR labels stemming from the root and intervening labels from the complete graph that are along the shortest paths between the respective ATR labels and the input label on the complete graph. Inferring the updated confidence of the input label can be obtained recursively by traversing the respective shortest paths from the ATR labels to the input label and wherein the confidences of all the intermediate labels in each shortest respective path are computed.

The method can include updating the set of model parameters based on feedback received from field observations to improve prediction capabilities. The set of model parameters can be computed using relative abundances of objects corresponding to the set of labels in a given geography. Obtaining sensor data can include obtaining sensor data that pre-existed the directive. It is also contemplated that obtaining sensor data can include obtaining sensor data that did not pre-exist the directive. It is contemplated that there can be more than one instance of the real world physical object in the geographical area and in the sensor data, wherein processing, modeling, and inferring are performed for each instance of the real world physical object. The probabilistic model can be a Markov Random Field (MRF). The modeled relationships within the set of labels using a probabilistic model can be established a priori before receiving the directive from the user.

A system includes an input device, an output device, and a processing device operatively connected to receive input form the input device and to provide output on the output device. The system also includes machine readable instructions in the processing device configured to cause the processing device to perform a method as disclosed above including receiving input on the input device including a directive from a user as explained above and outputting information on the output device to the user indicative of the updated confidence level.

The processing device can be operatively connected to a network of physical assets, wherein the directive includes a desired confidence level for the input label and wherein the machine readable instructions further cause the processing device to compare the desired confidence level to the updated confidence level, and in the event that the updated confidence level is below the desired confidence level, direct or redirect one or more of the physical assets to obtain further sensor data of the real world physical object.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 12 is a data table, showing a list of probabilities for data received from the ATR in the upper part and the inferred result on the lower part for the example of FIG. 11;

DETAILED DESCRIPTION OF THE PREFERRED EMBODIMENTS

Figure 1:
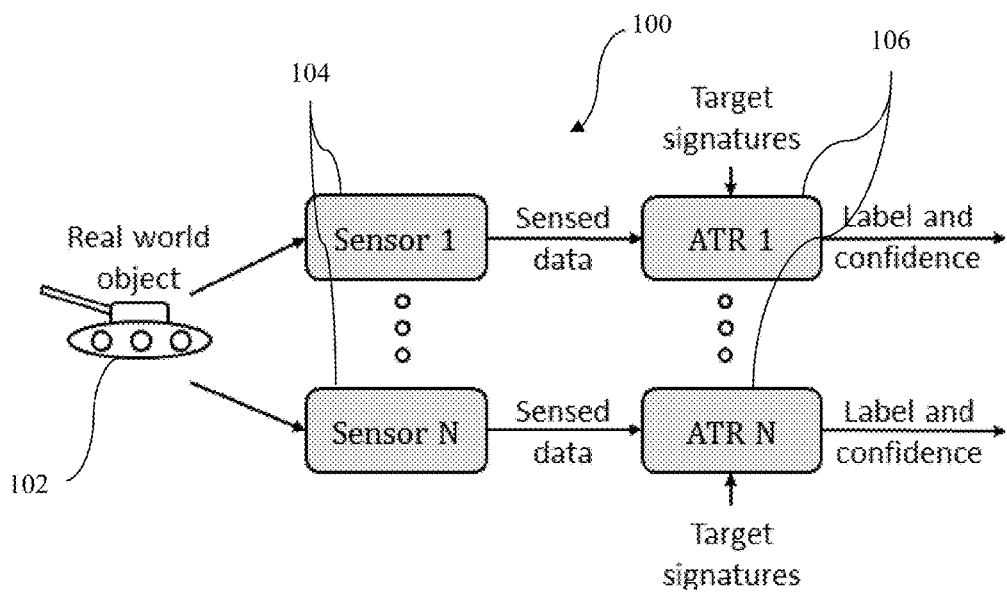
FIG. 1 is a schematic view of an embodiment of a data collection scenario constructed in accordance with the present disclosure, showing multiple sensors acquiring data representative of a physical real world object.

Reference will now be made to the drawings wherein like reference numerals identify similar structural features or aspects of the subject disclosure. For purposes of explanation and illustration, and not limitation, a partial view of an embodiment of a portion of a system in accordance with the disclosure is shown in FIG. 18 and is designated generally by reference character 1000. Other embodiments of systems in accordance with the disclosure, or aspects thereof, are provided in FIGS. 1-18, as will be described. The systems and methods described herein can be used to assist human analysts in target recognition.

1 INTRODUCTION

Figure 14:
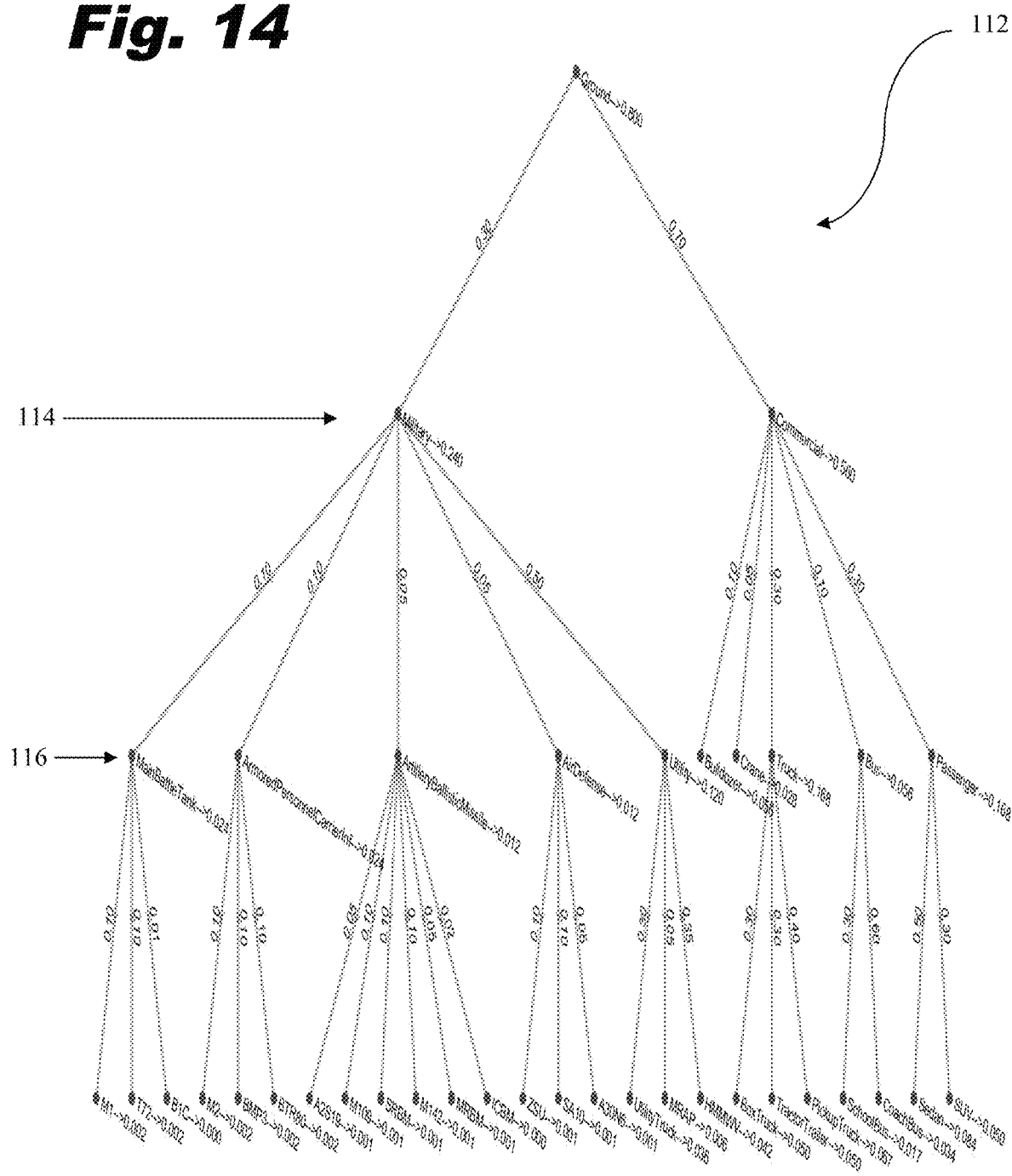
FIG. 14 is an example taxonomy of ground vehicles shown with model parameters and inferred a priori probabilities on all nodes.

Target taxonomy can be very useful for the purposes of target classification and identification from sensed data. In this context of target recognition, target taxonomy is a hierarchical grouping of objects of interest according to their similarity and differences in features. FIG. 14 shows an example taxonomy of ground vehicles 112, where a first sub-grouping 114 divides the vehicles in military and commercial categories, followed by a functional grouping 116, and finally the specific vehicles as leaves of the entire taxonomy tree.

Although the taxonomy is useful to an analyst from an organizational point of view, the benefits of this type of data structure go further if applied to the area of Automatic Target Recognition (ATR). ATR algorithms typically extract relevant features from sensed data to help them identify/classify the object. If the taxonomy organizes the objects such that coarser features are sufficient to assign objects to the upper layers of the taxonomy ("classify") and finer features are required to assign them to lower layers ("identify"), then the quality of the sensed data in terms of resolution and signal-to-noise ratio (SNR) dictates the finest level of the taxonomy that an ATR can possibly assign to an object. For example, if the resolution/SNR in sensed imagery is such that we can only make out a rough outline of the object, then we may be able to only classify it at the penultimate level of the tree shown in FIG. 14. For identification of the object (leaf labels of the tree), more resolution is required in the sensed imagery to make out finer details in the object.

In the context of an autonomous system that has access to a number of sensor and platforms operating in different modalities (SAR, EO, IR, MSI, HSI, FMV, etc.) with different imaging conditions and stand-off ranges, the quality of sensed data may vary continuously along with the ATR classification abilities. Consequently, we may have ATR detects on the same physical object classified with different labels of the taxonomy tree. Fusing ATR hits that have different labels but nevertheless correspond to the same physical object can be advantageous in two respects: First, the confidence of the detected object can be significantly improved by merging independent data from different modalities and quickly beat down the uncertainty inherent in individual ATR detects. Second, it allows us to infer target attributes that any individual sensor may be incapable of sensing. For example, a high frame-rate video sensor may not have the spatial resolution to uniquely identify the object but can give us a coarse category and accurate estimate of speed and heading of the object. A subsequent single-frame collect by a high-resolution EO sensor can identify the object but provides no information regarding motion. Combining the two detects across the taxonomy helps us to both uniquely identify the object and accurately determine its speed and heading.

To facilitate the fusion of ATR detects across the taxonomy, we need a probabilistic model of how the different labels in a taxonomy relate to each other. Such a model captures the relative distribution of the physical objects in a particular theater of operation and represents our a priori information even before we collect any data. The taxonomy provides a graphical structure for this model and can be invaluable in not only the representation of the model but also in inference, when the model is employed, and the learning of the model parameters both from data provided by human experts and/or data collected in the field.

In this disclosure, we formulate a probabilistic model of labels as a Markov Random Field (MRF) that has a very compact representation. The graphical structure of the MRF is adapted from the hierarchical structure of the taxonomy, which in addition to the conditional independence properties of the MRF also encodes the constraints that all the children are subsets of the parent node and mutually exclusive from each other. We derive efficient recursive algorithms for inference and fusion of ATR detections that scale linearly with the distance between the detected node and the desired node in the taxonomy tree. The method bears similarity to belief propagation in Bayesian networks but differs in the details as the algorithms developed for Bayesian networks are not directly applicable in our scenario (children of any node in the taxonomy are not conditionally independent given the parent node.) Our method can be regarded as a special case of sum-product message passing in clique trees. The specialization realizes efficiencies by directly constructing marginals on the nodes of the clique tree using the mutually exclusive property of the children rather than computing them. Further savings are realized by pre-computing and storing single node and pair-wise marginals to facilitate low overhead message passing during inference.

The disclosure is organized as follows: Section 2 formulates the label model that encodes the a priori information and extends it to include data provided by the ATR. Section 3 derives the inference and data fusion algorithms. The treatment proceeds by deriving the algorithm for a single ATR detect and then using it as a building block for the more complex fusion of multiple ATR detects. Section 4 shows a practical application of the algorithms on a toy model as well as a more realistic taxonomic model and illustrates the ability of the algorithms to cope with conflicting ATR data. Finally, Section 5 provides some concluding remarks.

2 PROBABILISTIC MODEL OF TARGET LABELS

In this section, we formulate a probabilistic model for labels in a taxonomy. The model encodes the relative occurrences of labels and their relationship with each other. This represents our a priori information and will enable us to perform inference on any label of the taxonomy given data collected in the field on some other label(s).

Figure 2:
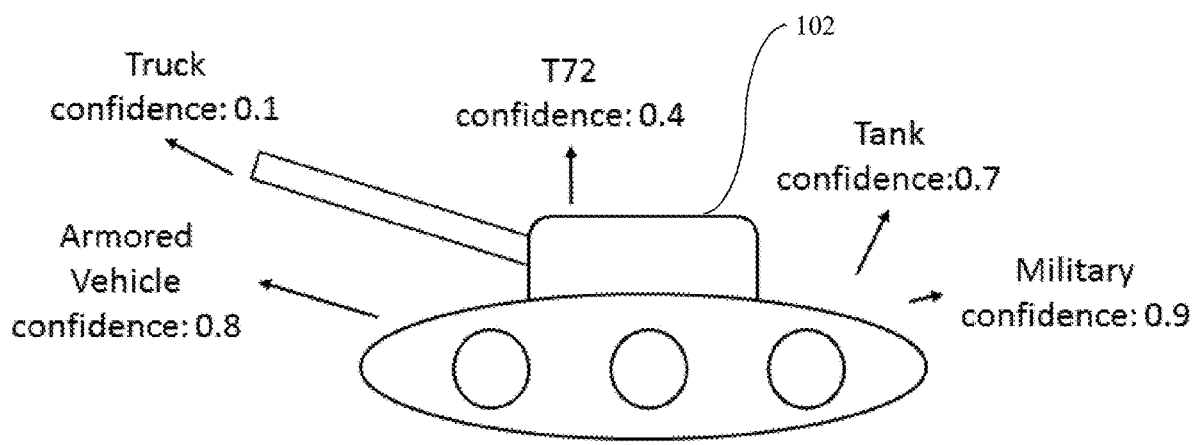
FIG. 2 is a schematic view of the real world object of FIG. 1, showing the assignment of labels and associated confidences by ATR algorithms.

FIG. 1 shows the data collection scenario 100 for the problem we are trying to address. A real world physical object 102 is imaged/sensed by one or more sensors 104. These sensor may be working in different modalities such as SAR, EO, IR, etc., and may image the object from different viewpoints. The sensor data may have one or more spatial dimensions and either be static or dynamic in time. The sensor data is then fed to ATR algorithms 106 that have been trained to detect a variety of targets of interest. The ATRs 106 may use an explicit signature for these targets as they manifest in a particular modality as in the case of model-based ATRs or implicit model weights as in deep-learning ATRs. If the object 102 is detected by any of the ATRs 106, it is assigned a label and an associated confidence. In this manner, the same physical object ends up being assigned multiple labels. FIG. 2 shows an example where the object 102 has been assigned multiple labels each accompanied by a confidence of that assignment.

Given these multiple label assignments and their associated confidences, the problem is to compute the confidence of any user specified label that can be assigned to the object in a given taxonomy. Note that the query label may or may not be present in the assignment set given to us. For a query label already in the assignment set, the computed confidence represents our updated belief that this label can be assigned to this object. This updated confidence may be higher or lower than the one received from the ATR. Essentially, the addition of any label to assignment set alters our current belief of the true identity of the world object and we answer queries based on this evolving belief. For the example shown in FIG. 2, the confidence of T72 as returned by the ATR is 0.4. But after observing all the other labels assigned by other ATRs, we would probably assign a higher confidence that the object is indeed a T72.

To answer queries of the type specified above, we need a model of all the labels in the taxonomy and how they relate to one another. Since a physical object in the world is assigned a subset of labels from the taxonomy, we model the labels as binary random variables that take on values in the set $\{1,0\}$, where the two values denote presence and absence of the label in the assignment set respectively. Let $\{l_1, \ldots, l_{n_l}\}$ denote $n_l$ labels in a target taxonomy and let $\mathbb{L} = \{1, \ldots, n_l\}$ denote the set of all $n_l$ indices. We would like to model the joint distribution of all the labels denoted as $P(\cap_{k \in \mathbb{L}} l_k)$. The most general model of such a distribution will require the specification of the joint probability of the $2^{n_l}$ combinations of the Na variables requiring a total of $2^{n_l}-1$ parameters since $$\sum_{\{l_k : k \in \mathbb{L}\}} P\left(\bigcap_{k \in \mathbb{L}} l_k\right) = 1.$$

Such a specification becomes quickly intractable as $n_l$ increases both from a storage and computational perspective. It is also impossible to elicit the parameters of such a model from expert knowledge. For the example taxonomy of FIG. 14 that has 38 labels, we would require specification of approximately 0.275 billion values to specify the complete model.

Fortunately, the hierarchical structure of the taxonomy provides a map of conditional independence among the sets of labels obviating the need for a full specification that spans all label combinations. Furthermore, the mutual exclusivity of the children of any node in the taxonomy, makes the probability of a large number of label combinations to be trivially zero. For example, a physical T72 on the ground will have the associated labels of "T72", "MainBattleTank", "Military", and "Ground" as seen in FIG. 14. Assigning any other label to this set associated with the T72 will result in a joint probability of zero. The assignment set varies as a function of the physical object but the number of viable combinations are reduced dramatically.

Figure 3:
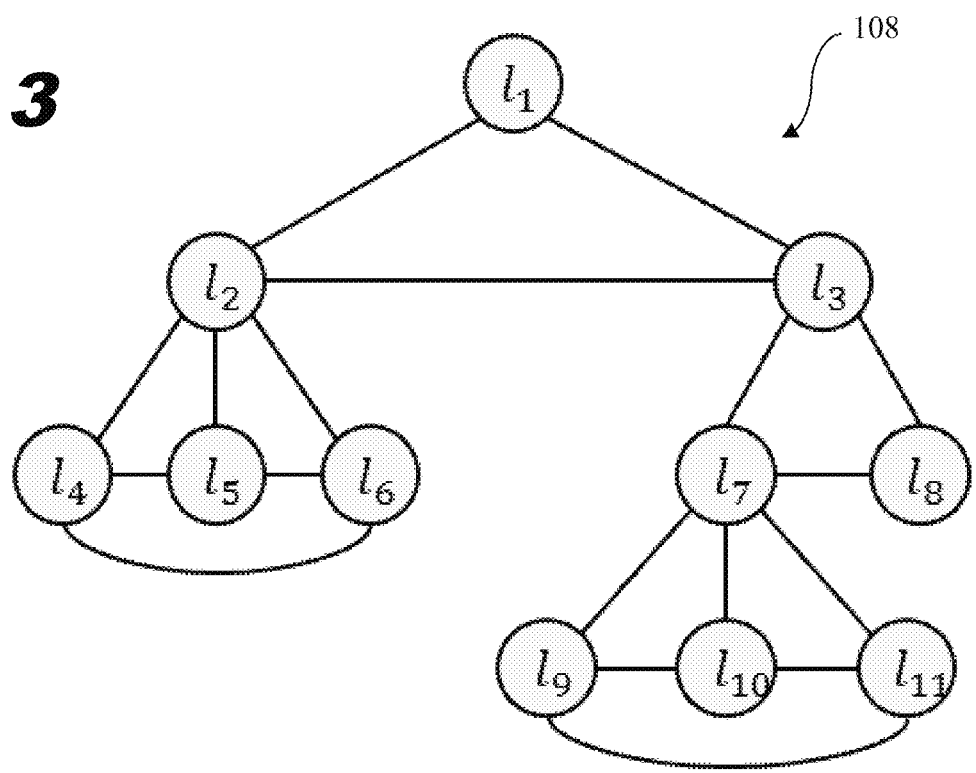
FIG. 3 is an undirected graph of a toy model with 11 nodes derived from a target taxonomy.

To encode the properties of conditional independence and mutual exclusivity of the children nodes implied by a target taxonomy, we model $P(\cap_{k \in \mathbb{L}} l_k)$ as a Markov Random Field $\mathbb{L}$ (MRF) on a undirected graph G={V, E} with nodes V and edges E. The graph G is derived from the target taxonomy by retaining all the original edges of the tree and then augmenting it with a set of undirected edges between all pairs of children of any node of the taxonomy. FIG. 3 shows such a undirected graph of a toy model 108 with 11 nodes. The edges between the children nodes are added to the taxonomy graph and models the fact that the children are not conditionally independent given the parent node. Rather the presence of any of the children nodes implies the absence of all the other children Let $\mathcal{C}(G)$ denote the set of all maximal cliques in the graph G. For each clique $C \in \mathcal{C}(G)$, let $\phi_C(\{l_i : i \in C\})$ be a non-negative, real-valued potential function that encodes the favorability of different combination of assignments to the labels in the clique. Then the joint distribution for the labels of the MRF factorizes as follows $$P(\cap_{k \in \mathbb{L}} l_k) = \frac{1}{Z} \prod_{C \in \mathcal{C}(G)} \phi_C(\{l_i : i \in C\}), \quad (1)$$

where Z is the normalization constant known as the partition function and is given as $$Z = \sum_{\{l_k : k \in \mathbb{L}\}} \prod_{C \in \mathcal{C}(G)} \phi_C(\{l_i : i \in C\}), \quad (2)$$

Figure 4:
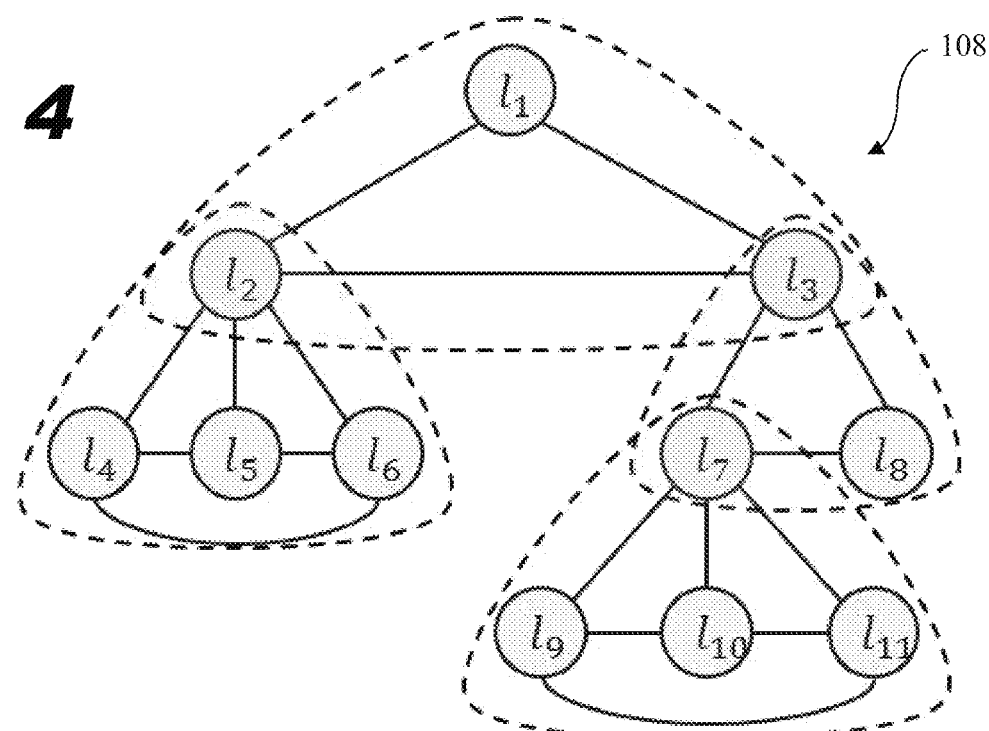
FIG. 4 is the undirected graph of FIG. 3, showing the 4 maximal cliques.

FIG. 4 shows the four maximal cliques of our toy model 108 as shaded triangles drawn with dashed lines and the joint distribution of the labels factorizes over these cliques. Basically, the factorization property is encoding the conditional independence of all the nodes in the child sub-tree of a particular node from all the remaining nodes given that node. So for example, given node $l_3$ in FIG. 3, the nodes in the child sub-tree $\{l_7, l_8, l_9, l_{10}, l_{11}\}$ are independent of the remaining nodes $\{l_1, l_2, l_4, l_5, l_6\}$ resulting in $$P(l_1, \ldots, l_{11}|l_3) = P(l_1, l_2, l_4, l_5, l_6|l_3) P(l_7, l_8, l_9, l_{10}, l_{11}|l_3). \quad (3)$$

This property holds for all nodes of the graph. If $\mathbb{T}(m)$ denotes the set of indices of all the nodes of child sub-tree of node $l_m$, then $$P(\cap_{k \in \mathbb{L}} l_k) = P(\cap_{k \in \mathbb{L} \setminus \mathbb{T}(m)} l_k | l_m) P(\cap_{k \in \mathbb{T}(m) \setminus m} l_k | l_m),$$
$$\forall m \in \mathbb{L} \quad (4)$$

In other words, each node partitions the graph into two subsets that are conditionally independent.

The MRF assumption dramatically reduces the parameterization complexity of the model. As seen from Eq. 1, the number of variables directly interacting have been reduced from $n_l$ to the maximum number of children of any particular node. The latter is much smaller but can be still large in the worst case. We can reduce this further by formulating the potential function to encode the mutual exclusive property. Note that the number of maximal cliques is equal to the number of nodes with children. Let $\mathbb{P}$ denote the set of indices of all parent nodes and $\mathbb{C}(k)$ denote the set of indices of children of node $k \in \mathbb{P}$. We choose the potential function to be the conditional probability of all the children given the parent. This choice not only satisfies the requirement for the potential function but also makes the computation of the partition function Z given by Eq. (2) trivial. This is important because the partition function in general is itself intractable to compute if the number of nodes are large. Substituting this choice of the potential function in Eq. 1, we obtain $$P(\cap_{k \in \mathbb{L}} l_k) = P(l_r) \prod_{k \in P} P(\cap_{i \in \mathbb{C}(k)} l_i | l_k), \quad (5)$$

where the index r denotes the root node of the graph G. We have added the factor $P(l_r)$ as part of the potential function of the clique corresponding to the root node. This encodes the a priori probability of the root node, which should be 1 given the object can be labeled using one of the nodes of the given taxonomy. Otherwise, it represents the chances that the object falls in this tree if multiple taxonomic trees are being considered. The partition function Z for this factorization is trivially 1 as it can be shown that $$\sum_{\{l_k : k \in \mathbb{L}\}} P(l_r) \prod_{k \in \mathbb{P}} P(\cap_{i \in \mathbb{C}(k)} l_i | l_k) = 1. \quad (6)$$

The proof involves performing the summation from the bottom of the tree and moving upwards. The summation operation can be moved inwards in the expression above for each set of leaf nodes until it operates just on the conditional probability of the leaf nodes given their parents. These sum to 1 by construction and reduces the size of the tree by one level from the bottom. Applying the same operation repeatedly on the smaller sub-tree will finally remove all layers of the tree and the result is unity.

The mutually exclusive property of the children is now explicitly encoded by the specifying the conditional probability of the children given that the parent is present as follows $$P(\cap_{i \in \mathbb{C}(k)} l_i | l_k = 1) = \quad (7)$$

$$\begin{cases} P(l_m = 1 | l_k = 1), & l_m = 1, l_i = 0, \forall i \in \mathbb{C}(k), i \neq m \\ 1 - \sum_{m \in \mathbb{C}(k)} P(l_m = 1 | l_k = 1), & l_i = 0, \forall i \in \mathbb{C}(k) \\ 0 & \text{otherwise} \end{cases}$$

Note that assignments where only one label is present and all other labels are absent are given a non-zero probability (first condition in Eq. (7).) All other assignments have zero probability. The assignment of all labels to absent can also have non-zero probability (second condition in Eq. (7)), if the conditional probability of all the children do not sum to 1, i.e., $$\sum_{m \in \mathbb{C}(k)} P(l_m = 1 | l_k = 1) < 1.$$

This models the scenario that there are other labels that can be assigned to the object but they are not explicitly modeled. The conditional probability of the children given that the parent is absent is trivially given by $$P(\cap_{i \in \mathbb{C}(k)} l_i \mid l_k = 0) = \begin{cases} 1, & l_i = 0, \forall i \in \mathbb{C}(k) \\ 0, & \text{otherwise} \end{cases}. \quad (8)$$

Clearly, no assignment can have any of the children to be present in this case. The remaining case of all labels absent is guaranteed.

With these definitions, the entire model can be specified by just the conditional probability of a node is present given that its parent is present, $P(l_m=1|l_{p(m)}=1)$ for all $m \in \mathbb{L} \setminus r$ and $p(m)$ denotes the parent of m. There are $n_l-1$ of these conditional probabilities, one for each node in the tree except for the root node. There is also the a priori probability of the root node $P(l_r)$. So we have successful reduced the number of the parameters required for the original unconstrained model from $2^{n_l}-1$ to $n_l$. Note that we would have obtained a similar compact representation had we assumed the tree to be a Bayesian network, where all the children are conditionally independent given the parent. However, this would not have captured the interactions between the children. Since there are $n_l$ nodes in the graph, this is the most compact representation that is possible that retains independent flexibility for each node.

Both Eqs. (7) and (8) can be compactly written as $$P(\cap_{i \in \mathbb{C}(k)} l_i \mid l_k) = \begin{cases} P(l_m = 1 \mid l_k), & l_m = 1, l_i = 0, \forall i \in \mathbb{C}(k), i \neq m \\ 1 - \sum_{m \in \mathbb{C}(k)} P(l_m = 1 \mid l_k), & l_i = 0, \forall i \in \mathbb{C}(k) \\ 0 & \text{otherwise} \end{cases}, \quad (9)$$

along with the following constraints $$\sum_{m \in \mathbb{C}(k)} P(l_m = 1 \mid l_k) \leq 1, \quad (10)$$

$$P(l_m = 1 \mid l_k = 0) = 0, \forall m \in \mathbb{C}(k). \quad (11)$$

The first inequality given by Eq. (10) allows for room to have a "other" category in the children of any node if it is strictly less than one. We can sweep in this "other" category all the labels that are in the theater of operations but we are not interested in modeling or the ATRs are not capable of detecting. The second constraint given by Eq. (11) ensures that all the children labels are a subset of the parent label so if the parent label is absent, none of the children labels can be present.

2.1 Label Model Augmented with Data

We now have a probabilistic model for the labels that encodes our a priori information. In this section, we augment this model when data is observed.

Let d denote the raw data collected by a sensor. The ATRs operate on this raw data from one or more sensors to produce detections tagged with one of the labels in the taxonomy. Let $\mathbb{D}$ denote the set of indices of the labels that have been detected in the data. For each detected label, the ATR returns the likelihood of that label $P(d_k|l_k)$, i.e., the probability of observing the data d given that the object 102 has the label $l_k$. Let $n_d$ denote the number of detected labels. For convenience of notation, we have used the subscript k on the raw data d to denote the piece of data that was used for detecting label $l_k$. The raw data could either be a single image/signal or multiple images/signals. In both cases, multiple detects can be made at the same physical location with different labels. Each of these detections can be regarded as a new data collect, hence the subscript k on the data.

The joint probability of all the labels and the data is given as $$P(\cap_{k \in \mathbb{L}} l_k, \cap_{k \in \mathbb{D}} d_k) = P(\cap_{k \in \mathbb{D}} d_k \mid \cap_{k \in \mathbb{L}} l_k) P(\cap_{k \in \mathbb{L}} l_k) \quad (12)$$

$$= \prod_{i \in \mathbb{D}} P(d_i \mid l_i) P(\cap_{k \in \mathbb{L}} l_k) \quad (13)$$

$$= P(l_r) \prod_{k \in \mathbb{P}} P(\cap_{i \in \mathbb{C}(k)} l_i \mid l_k) \prod_{i \in \mathbb{D}} P(d_i \mid l_i), \quad (14)$$

where the second line assumes that the $n_d$ pieces of data are independent given the labels and third line uses the model from Eq. (5). Note that this is a good approximation even for multiple detects (each with a different label) on a single collection, i.e., the same portion of the data running through different ATR algorithms, since the noise in the detections is typically dominated by the model mismatch that the ATR employs for each label and not the measurement noise.

Figure 5:
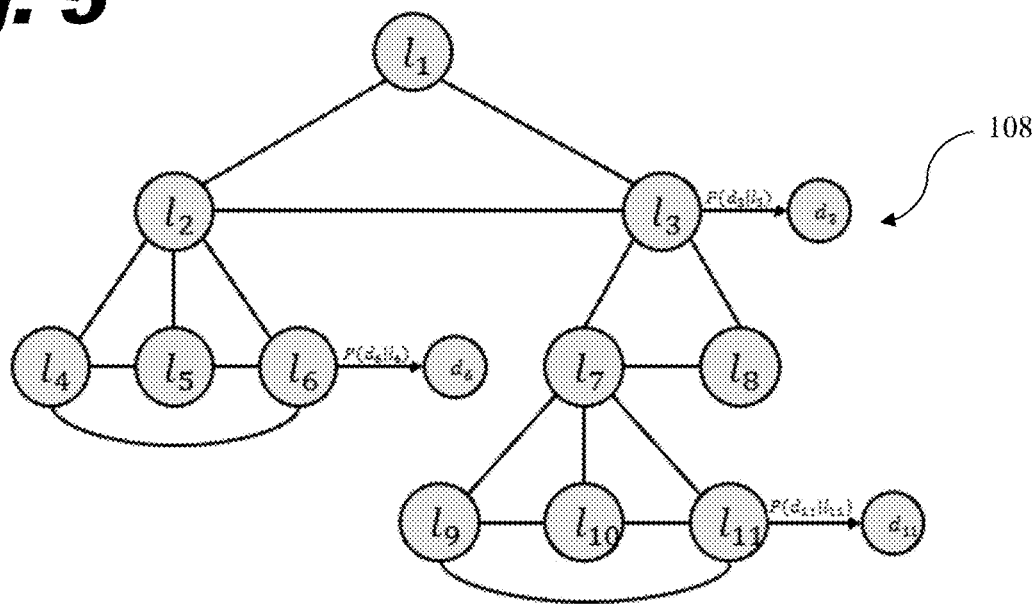
FIG. 5 is the undirected graph of FIG. 3, showing the graph augmented with 3 data nodes to account for the ATR detects on the collected data.

FIG. 5 shows the graph for the modified MRF for our toy model 108 where we have $n_d=3$ detects on the nodes $\mathbb{D} = \{3,6,11\}$. The directed edge between node $l_k$ and $d_k$ encodes the $\mathbb{D}$ conditional probability $P(d_k|l_k)$ and we have added 3 more cliques to the graph in this particular case.

2.2 Model Estimation

As seen previously, the model parameters comprises $n_l-1$ conditional probabilities, namely, $P(l_m=1|l_{p(m)}=1)$, $\forall m \in \mathbb{L} \setminus r$, and the a priori probability of the root, $P(l_r)$. These parameters are quite intuitive and can be elicited from expert knowledge for a particular theater of operation (TO). Alternatively, they can be computed by the relative frequency of occurrence of objects of different labels in a particular TO. Let N denote the total number of objects in a TO that can potentially be detected by ATRs. Let $N_m$ denote the number objects in this TO that can be assigned the label $l_m$. Then using the frequentist interpretation of probability, we obtain $$P(l_r = 1) = \frac{N_r}{N} \quad (15)$$

$$P(l_m = 1 \mid l_{p(m)} = 1) = \frac{N_m}{N_{p(m)}}, \forall m \in \mathbb{L} \setminus r. \quad (16)$$

The estimates provided by Eqs. (15) and (16) can also be employed for a dynamic update to the model in the field once ground truth data is provided on detections produced by the system. So we initialize the model with best estimates of N and $\{N_m : m \in \mathbb{L}\}$ for a particular TO. Then at a later time, we are provided confirmation that a object in the TO has been identified by other independent means (such as a visual confirmation by personnel in the field) and the object can be assigned labels in the set $\mathbb{O}$. Using this information, the number of objects for each label is updated as follows $$N \leftarrow N+1 \quad (17)$$

$$N_m \leftarrow N_m+1, \forall m \in \mathbb{O} \quad (18)$$

The updated object counts are used in Eqs. (15) and (16) to obtain an updated label model. In this manner, the label model evolves and becomes more accurate over time as feedback is provided from the field.

3 INFERENCE ON LABEL MODEL

Armed with the label model, we are now in a position to infer probabilities that were not directly measured. For instance, if a measurement is made on $l_k$ by an ATR detect, $P(d_k|l_k)$, we can use the model to infer $P(d_k|l_m)$ for all $m \in \mathbb{L}$. Here we are leveraging the power of the a priori model that encodes the relative distribution of the labels. For example, if we get an ATR detect on "MainBattleTank" in the taxonomy shown in FIG. 14, we can compute the probabilities of all the other labels such as "T72", "M1", "Military", etc., even if we have no signatures for that label for the ATR to find them directly in the collected data.

The model can also be employed to perform data fusion over multiple collects or multiple ATR algorithms on a single collect. So if $n_d$ pieces of data are collected and we are given $P(d_k|l_k)$, for all $k \in \mathbb{D}$, we can infer the probability $P(\cap_{k \in \mathbb{D}} d_k|l_m)$ for all $m \in \mathbb{L}$. This is extremely powerful as the independent collects can quickly beat down the uncertainty and increase/decrease our confidence on any label of interest in the taxonomy.

The fused probability of the data given any label is obtained simply by marginalizing out all the other labels from the joint probability given by Eq. (14) and an appropriate normalization $$P(\cap_{k \in \mathbb{D}} d_k | l_m) = \frac{\sum_{\{l_k : k \in \mathbb{L} \setminus m\}} P(\cap_{k \in \mathbb{L}} l_k, \cap_{k \in \mathbb{D}} d_k)}{P(l_m)} \quad (19)$$

$$= \frac{\sum_{\{l_k : k \in \mathbb{L} \setminus m\}} P(l_r) \prod_{k \in \mathbb{P}} P(\cap_{i \in \mathbb{C}(k)} l_i | l_k) \prod_{i \in \mathbb{D}} P(d_i | l_i)}{\sum_{\{l_k : k \in \mathbb{L} \setminus m\}} P(l_r) \prod_{k \in \mathbb{P}} P(\cap_{i \in \mathbb{C}(k)} l_i | l_k)} \quad (20)$$

Although simple to derive, the expression in Eq. (20) is formidable to compute directly and becomes quickly intractable as $n_l$ grows. The number of operations to compute this fused probability is $\mathcal{O}(2^{n_l})$. The naive computation is therefore not an alternative. This is the same problem we had in representation of the model. Fortunately, the conditional independence properties encoded by the MRF can be leveraged to compute Eq. (20) very efficiently.

3.1 Pre-Computation of Graph Properties

As we will see in the subsequent sections, the fast algorithm for computing the fused data probability requires the use of the conditional probabilities associated with all edges and the a priori probability of all the nodes in the graph. These are used over and over again and it is most efficient to compute these once at start up and store them in the graph for future use. We derive an efficient recursive algorithm for computing these quantities in this section.

Let $p(m)$ denote the parent node of node m. Then the a priori probability of any node m is easy is compute given the a priori probability of its parent using $$P(l_m) = \sum_{l_k} P(l_m | l_k) P(l_k), m \in \mathbb{L}, k = p(m) \quad (21)$$

Since $P(l_m|l_{p(m)})$ is a known model parameter, all the a priori probabilities can be computed recursively by starting at the root node of the graph and traversing the children nodes. As each sub-tree of the graph is visited, the a priori probability of the root node is known and can be plugged in Eq. (21).

The model parameters give the conditional probability of the child given the parent. The inverse conditional probability, i.e., the conditional probability of the parent given the child can be computed using Bayes rule once all the a priori probabilities are known $$P(l_k | l_m) = \frac{P(l_m | l_k) P(l_k)}{P(l_m)}, m \in \mathbb{L}, k = p(m). \quad (22)$$

Finally, the conditional probability between siblings is given as $$P(l_i | l_j) = \frac{\sum_{l_k} P(l_i, l_j | l_k) P(l_k)}{P(l_j)}, i \in \mathbb{L}, k = p(i), j \in \mathbb{C}(k), j \neq i, \quad (23)$$

where $P(l_i, l_j|l_k)$, the joint conditional probability of the sibling pair can be computed by marginalizing out all the other siblings from Eq. (9) as follows $$P(l_i, l_j | l_k) = \sum_{\{l_m : m \in \mathbb{C}(k), m \neq i, m \neq j\}} P(\cap_{m \in \mathbb{C}(k)} l_m | l_k). \quad (24)$$

Alternatively, we may directly compute it using the same logic as in Eq. (9)

$$P(l_i, l_j | l_k) = \begin{cases} P(l_i = 1 | l_k), & l_i = 1, l_j = 0 \\ P(l_j = 1 | l_k), & l_i = 0, l_j = 1 \\ 1 - P(l_i = 1 | l_k) - P(l_j = 1 | l_k), & l_i = 0, l_j = 0 \\ 0 & l_i = 1, l_j = 1 \end{cases} \quad (25)$$

The set of Eqs. (21)-(25) have to be executed in a certain order to ensure that all quantities required in their computation have previously been computed. Algorithm 1 shows a recursive routine POPULATEGRAPH that traverses the tree from the root down to the leaves and computes all the a priori probabilities and conditional probabilites between all pairs of adjacent nodes in both direction. This additional information is stored in the graph itself as shown in Algorithm 1. Note that we use the same notation G to refer to the transformed directed graph as the previous undirected graph.

| Algorithm 1: POPULATEGRAPH |
|---|

```
Algorithm 1 PopulateGraph
 1: function POPULATEGRAPH(G, k)          G is graph, k is index of root node of sub-graph i
 2:    for m ∈ ℭ(k) do                                  for all children of node k
```

3: 
$$P(l_m) = \sum_{l_k} P(l_m|l_k)P(l_k)$$
Use Eq. (21)

4: 
$$P(l_k|l_m) = \frac{P(l_m|l_k)P(l_k)}{P(l_m)}$$
Use Eq. (22)

```
 5:       G ← {G, P(l_m), P(l_k|l_m)}        Update graph with a priori and conditional probability
 6:       POPULATEGRAPH(G, m)
 7:    end for
 8:    for i ∈ ℭ(k), j ∈ ℭ(k), i ≠ j do                For all pairs of children of node k
 9:       Compute P(l_i, l_j|l_k) using Eq. (25)
```

10:
$$P(l_i|l_j) = \frac{\sum_{l_k} P(l_i, l_j|l_k)P(l_k)}{P(l_j)}, \quad P(l_j|l_i) = \frac{\sum_{l_k} P(l_i, l_j|l_k)P(l_k)}{P(l_i)}$$
Use Eq. (23)

```
11:       G ← ΔG, P(l_i|l_j), P(l_j|l_i)}                         Update graph
12:    end for
13: end function
```

Figure 6:
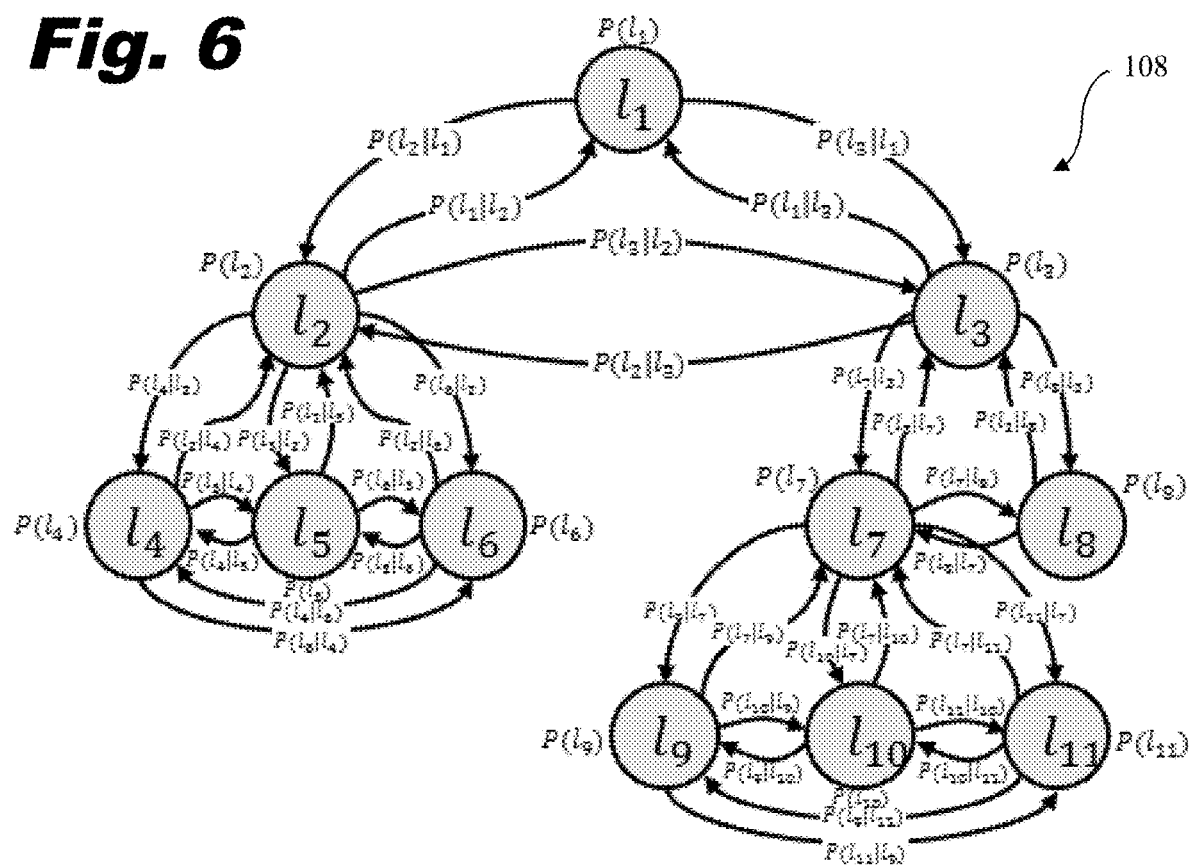
FIG. 6 is a directed graph after processing the undirected graph of FIG. 3, showing the conditional probabilities of each directed edge.

After POPULATEGRAPH is called on the root node i of our toy model 108 shown in FIG. 3, the graph is transformed to a directed graph shown in FIG. 6. The directed edge from any node i to node j carries the conditional probability $P(l_j|l_i)$. Each node i also carries its a priori probability $P(l_i)$. The graph is now ready for the fast inference algorithm derived in the subsequent sections.

3.2 Inference with a Single Observation

This section considers the case when there is a single observation ($n_d=1$). The algorithm in this section will be used as a building block for the more complicated case of fusing multiple observations $n_d>1$.

Let j denote the node on which the observation is made. Then the inference task is to compute $P(d_j|l_k)$ for all $k \in \mathbb{L}$. First compute the shortest path between nodes j and k using a breadth-first search on the directed graph G. Let the set of nodes $\{j_1 \to \ldots \to j_n\}$ denote the n intermediate nodes in the path between j and k. Augment this path with the starting and ending node to obtain $\{j_0 \to \ldots \to j_{n}+1\}$, where $j_0=j$ and $j_{n+1}=k$. Then the conditional probability of the end node given the start node is given as $$P(l_{j_{n+1}}|l_{j_0}) = \frac{1}{P(l_{j_0})} \sum_{\{l_{j_i}: i=1,\ldots,n\}} P\left(\bigcap_{i=0}^{n+1} l_{j_i}\right). \quad (26)$$

The direct computation of this quantity is $\mathcal{O}(2^n)$ and is not feasible. However, using the conditional independence of the MRF, the conditional probability can be computed in a recursive fashion as follows $$P(l_{j_{i+1}}|l_{j_0}) = \sum_{l_{j_i}} P(l_{j_{i+1}}|l_{j_i})P(l_{j_i}|l_{j_0}), \, i = 1, \ldots, n. \quad (27)$$

which reduces this cost to $\mathcal{O}(n)$ and has a linear rather than exponential scaling with the length of the path.

Given the ability to quickly compute the conditional probability between any two nodes j and k, the inferred probability of the data on node k given the data on node j is $$P(d_j|l_k) = \sum_{l_j} P(d_j|l_j)P(l_j|l_k)$$

Substituting the recursion of Eq. (27) for the conditional probability, we obtain $$P(d_{j0}|l_{j_{i+1}}) = \sum_{l_{j_i}} P(d_{j0}|l_{j_i})P(l_{j_i}|l_{j_{i+1}}), \, i = 0, \ldots, n \quad (28)$$

Figure 7A:
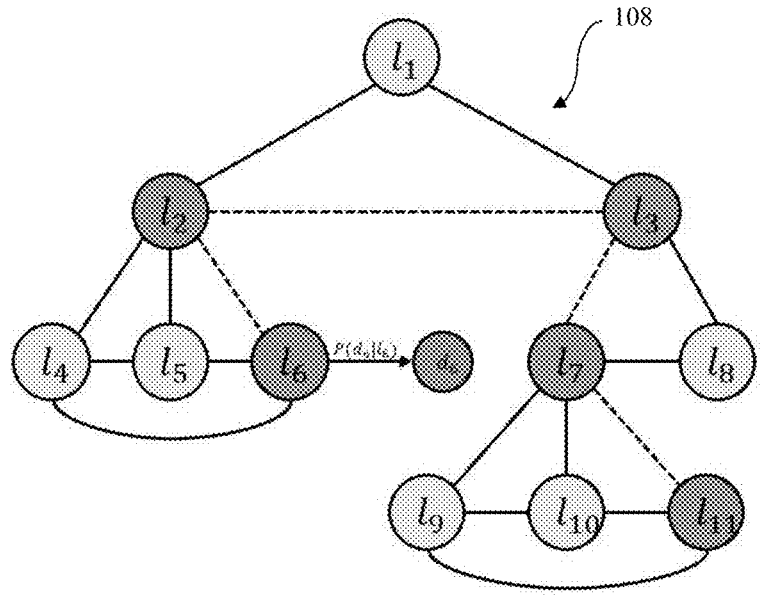
FIG. 7A is the undirected graph of FIG. 3, showing the shortest path between node $l_6$ where the ATR detect is received, and node $l_{11}$.
Figure 7B:
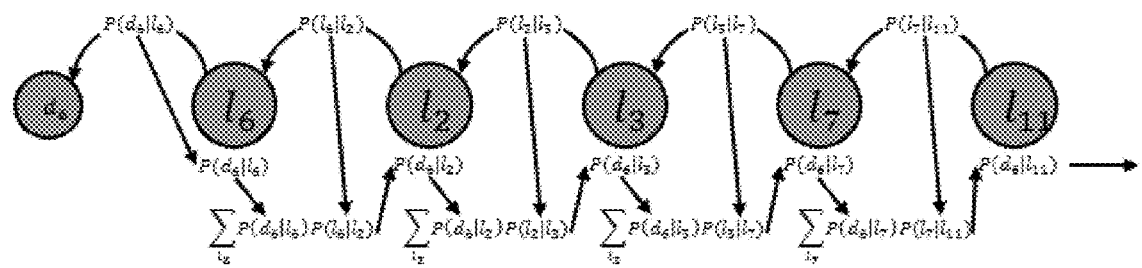
FIG. 7B is a data flow diagram, showing a recursion operation resulting in the inferred likelihood all along the path until node $l_{11}$ is reached.
Figure 7C:
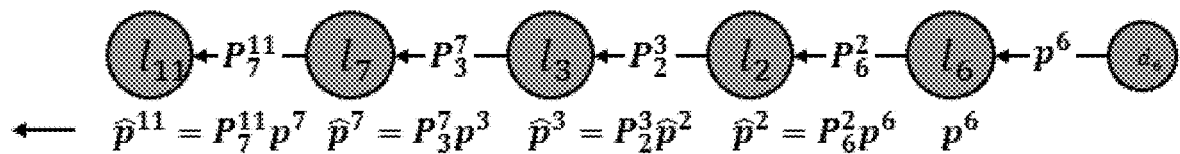
FIG. 7C is a data flow diagram, showing a recursion for a posterior probability propogation in vector matrix notation.

FIGS. 7A-7C illustrate this recursion for our toy model. FIG. 7A shows the complete graph with likelihood data observed on node $l_6$. We are interested in the data likelihood on node $l_{11}$. The shortest path is shown with a dashed line. FIG. 7B shows the recursion steps of Eq. (28) graphically. We see that all the intermediate inferred data likelihood are also generated for the nodes in the path until we reach the destination node $l_{11}$. Note that for likelihood propagation, the backward facing links in the directed graph are employed.

Note that the sum-product in the recursion of Eq. (28) can be written as a vector-matrix product and makes for a more compact notation. Towards this end, let $$p_k^j \begin{bmatrix} P(l_j = 1|l_k = 1) & P(l_j = 1|l_k = 0) \\ P(l_j = 0|l_k = 1) & P(l_j = 0|l_k = 0) \end{bmatrix} \quad (29)$$

denote a 2×2 matrix containing the conditional probability of $l_j$ given $l_k$. Note the variable in the subscript/superscript spans the columns/rows of the matrix respectively. similarly, let $$p_j = [P(d|l_j=1) P(d|l_j=0)] \quad (30)$$

denote a 1×2 row vector of data probabilities. Note that we have omitted the subscript for the data d in this vector. This gives us the flexibility to use the same notation for ATR detected probability and inferred probability on any node except for using a ^ on the latter. For example, $p_j \equiv P(d_j|l_j)$ where the subscript on d and l match (ATR detect) and $\hat{p}_j = P(d_k|l_j)$ where the subscript on d and l do not match (inferred probability.) Using this notation, Eq. (28) can be rewritten as $$\hat{p}_{j_{n+1}} = p_{j_0} P_{j_1}^{j_0} P_{j_2}^{j_1} \ldots P_{j_n}^{j_{n-1}} P_{j_{n+1}}^{j_n} = p_{j_0} \prod_{i=0}^{n} P_{j_{i+1}}^{j_i} \quad (31)$$

The above matrix multiplication can be done by starting from the left and multiplying the matrices on the right one by one or starting from the right and multiplying the matrices on the left one by one. Even though the final result remains the same, the multiplication from the left is more computationally efficient than the one from the right. In the first case, a vector is propagated from the left to the right, whereas, a matrix is propagated from the right to the left until it is collapsed to a vector right at the very end. The former order of multiplication is a factor of 2 more efficient than the latter.

The expressions above give the propagation of the data likelihood $P(d_j|l_j)$. What is more useful from a decision perspective, is the posterior probability of the label given the data, $P(l_j|d_j)$. Bayes rule allows us to convert between the two $$P(l_j|d_j) = \frac{P(d_j|l_j)P(l_j)}{P(d_j)} = \frac{P(d_j|l_j)P(l_j)}{\sum_{l_j} P(d_j|l_j)P(l_j)} \quad (32)$$

This can be done as soon as the ATR detects are received and all inference can then be performed in the posterior space. We use $$p^j = \begin{bmatrix} P(l_j = 1|d) \\ P(l_j = 0|d) \end{bmatrix} \quad (33)$$

a column vector to denote the posterior probability. The inferred posterior probability is then given as $$\hat{p}^{j_{n+1}} = P_{j_n}^{j_{n+1}} P_{j_{n-1}}^{j_n} \ldots P_{j_1}^{j_2} P_{j_0}^{j_1} p^{j_0} = \prod_{i=n}^{0} P_{j_i}^{j_{i+1}} p^{j_0} \quad (34)$$

Note that the matrix multiplication order in Eq. (34) is reversed from that in Eq. (31). It looks as if Eq. (34) is the transpose of Eq. (31) but that is misleading since $P_k^j \neq P_j^{k^T}$.

FIG. 7C shows the recursion in Eq. (34). Note how we are using the forward links of the directed graph in the propagation of the posterior probability. Compare this to the links used in FIG. 7B.

Algorithm 2 captures the recursion derived above to obtain the inferred probability on any node of the graph. Note that the input to the routine INFERPROBABILITY can itself be an inferred probability and is not restricted to be a raw ATR detect. This flexibility allows the routine to serve as a building block for data fusion derived in the next section.

Algorithm 2: INFERPROBABILITY

Algorithm 2 InferProbability
1: function INFERPROBABILITY(k, j, P(dll$_j$), G)                 Compute P(dll$_k$) given P(dll$_j$)
2:     {j, j$_1$, . . . , j$_n$, k} = FINDSHORTESTPATH(j, k, G)    Breadth-first search on directed graph
3:     j$_0$ = j, j$_{n+1}$ = k
4:     for i = 0, . . . , n do                                     for all nodes in the path
5:         $P(d|l_{j_{i+1}}) = \sum_{l_{j_i}} P(d|l_{j_i}) P(l_{j_i}|l_{j_{i+1}})$
6:     end for
7:     return P(dll$_{j_{n+1}}$)
8: end function

3.3 Fusion with Multiple Observations

The general expression for the likelihood of the all the observed data conditioned on a node m as shown in Eq. (20) requires the marginalization on all the nodes of the taxonomy. This expression can be simplified and the marginalization can be confined to a smaller subset of nodes. Towards this end, use the directed graph G to find the shortest path from node m to all nodes in the set $\mathbb{D}$. From these paths, construct a tree T with node m as the root and the nodes in the set $\mathbb{D}$ as leaves or parent nodes such that the shortest path from the set $\mathbb{D}$ to node m in graph G is preserved in tree T. Let $\mathbb{T}_T(i)$ denote the subset of nodes that comprise the sub-tree with root node i of the overall tree T. Therefore $\mathbb{T}_T(m)$ denotes all the nodes in the tree T. Similarly, define $$\mathbb{T}_{T_d}(i) \stackrel{def}{=} \mathbb{D} \cap \mathbb{T}_T(i), \quad (35)$$

which denotes the subset of nodes in sub-tree with root node i that belong to set $\mathbb{D}$, i.e., nodes on which we have ATR detection data. Note that not all nodes in the tree T are in the set $\mathbb{D}$ since there may be intermediate nodes in the shortest path between m and set $\mathbb{D}$. Consequently, $\mathbb{T}_{T_d}(i) \subseteq \mathbb{T}_T(i)$ and $\mathbb{D}_{T_d}(m) \equiv \mathbb{D}$.

FIG. 8 shows the process of the tree construction for the graph of FIG. 5 with data likelihood required on node $l_4$. FIG. 8A show the shortest path as a dashed line between $l_4$ and the nodes in the data set $\mathbb{D} = \{3,6,11\}$. These paths are used to compose a tree with node $l_4$ as the root as shown in FIG. 8B. The data flow in the recursive computation of $P(d_{11}, d_3, d_6|l_4)$ is shown using the solid arrows. Here $$\begin{aligned}
\mathbb{T}_T(4) &= \{2, 3, 4, 6, 7, 11\} & \mathbb{T}_{T_d}(4) &= \{3, 6, 11\} \\
\mathbb{T}_T(2) &= \{2, 3, 7, 11\} & \mathbb{T}_{T_d}(2) &= \{3, 11\} \\
\mathbb{T}_T(3) &= \{3, 7, 11\} & \mathbb{T}_{T_d}(3) &= \{3, 11\} \\
\mathbb{T}_T(7) &= \{7, 11\} & \mathbb{T}_{T_d}(7) &= \{11\} \\
\mathbb{T}_T(11) &= \{11\} & \mathbb{T}_{T_d}(11) &= \{11\}
\end{aligned} \quad (36)$$

$\mathbb{T}_T(6) = \{6\}$  $\mathbb{T}_{T_d}(6) = \{6\}$

Using these set definitions, divide all the nodes in the taxonomy, $\mathbb{L}$, into two sets, namely, $\mathbb{T}_T(m)$ and $\bar{\mathbb{T}}_T(m) = \mathbb{L} \setminus \mathbb{T}_T(m)$ Then Eq. (20) can be simplified as follows $$P\left(\bigcap_{k \in \mathbb{D}} d_k | l_m\right) = \frac{\sum_{\{l_k : k \in \mathbb{L} \setminus n\}} P\left(\bigcap_{k \in \mathbb{L}} l_k\right) \prod_{i \in \mathbb{D}} P(d_i | l_i)}{P(l_m)} \quad (37)$$

$$= \sum_{\{l_k : k \in \mathbb{T}_T(m) \setminus n\}} P\bigcap_{k \in \mathbb{T}_T(m) \setminus n} l_k | l_m \prod_{i \in \mathbb{D}} P(d_i | l_i)$$

$$\underbrace{\sum_{\{l_n : n \in \mathbb{T}_T(m)\}} P\left(\bigcap_{n \in \mathbb{T}_T(m)} l_n \cap_{n \in \mathbb{T}_T(m)} l_n\right)}_{=1}$$

$$P\left(\bigcap_{k \in \mathbb{T}_{T_d}(m)} d_k | l_m\right) =$$

$$\sum_{\{l_k : k \in \mathbb{T}_T(m) \setminus n\}} P\left(\bigcap_{k \in \mathbb{T}_T(m) \setminus n} l_k | l_m\right) \prod_{i \in \mathbb{T}_{T_d}(m)} P(d_i | l_i).$$

to only consider nodes in the set $\mathbb{T}_T(m)$.

Before proceeding further, we will need to define a few more sets that will be useful in reducing Eq. (37) to a recursion. Recall, that $\mathbb{C}(m)$ is the set of all children of node $m$ in the directed graph G. On the same lines, let $\mathbb{C}_T(m)$ denote the set of children of node $m$ on the tree T. Note that the tree is dependent on the set of nodes $\mathbb{D}$ on which data is collected as described earlier and keeps changing as new data comes in. Using these two sets of children nodes, define the sets $\mathbb{G}_T(m)$ and $\bar{\mathbb{G}}_T(m)$ as $$\mathbb{G}_T(m) \overset{def}{=} \mathbb{C}_T(m) \cap \mathbb{C}(m) \quad (38)$$

$$\bar{\mathbb{G}}_T(m) \overset{def}{=} \mathbb{C}_T(m) \setminus \mathbb{G}_T(m). \quad (39)$$

Essentially, the sets $\mathbb{G}_T(m)$ and $\bar{\mathbb{G}}_T(m)$ are dividing the set of children nodes in $\mathbb{C}_T(m)$ such that they belong to a single clique. The set $\mathbb{G}_T(m)$ belongs to a clique parented by node $m$ and the set $\bar{\mathbb{G}}_T(m)$ belongs to a clique parented by the parent of node $m$. The nodes in these two sets are conditionally independent given $m$; a property we will leverage in the derivation of the recursion.

Given these set definitions and using the conditional independence properties of the MRF, Eq. (37) can be derived to be equivalent to the following recursion $$P\left(\bigcap_{k \in \mathbb{T}_{T_d}(m)} d_k | l_m\right) = \quad (40)$$

$$\begin{cases} P(d_m|l_m) P\left(\bigcap_{k \in \mathbb{G}_{T_d}(m)} d_k|l_m\right) \\ \quad P\left(\bigcap_{k \in \bar{\mathbb{G}}_{T_d}(m)} d_k|l_m\right), & m \in \mathbb{T}_{T_d}(m) \\ P\left(\bigcap_{k \in \mathbb{G}_{T_d}(m)} d_k|l_m\right) \\ \quad P\left(\bigcap_{k \in \bar{\mathbb{G}}_{T_d}(m)} d_k|l_m\right), & m \notin \mathbb{T}_{T_d}(m) \end{cases}$$

where $$P\left(\bigcap_{k \in \mathbb{G}_{T_d}(m)} d_k|l_m\right) = \quad (41)$$

$$\sum_{\{l_k : k \in \mathbb{G}_T(m)\}} P\left(\bigcap_{k \in \mathbb{G}_T(m)} l_k|l_m\right) \prod_{i \in \mathbb{G}_T(m)} P\left(\bigcap_{k \in \mathbb{T}_{T_d}(i)} d_k|l_i\right)$$

$$P\left(\bigcap_{k \in \bar{\mathbb{G}}_{T_d}(m)} d_k|l_m\right) = \quad (42)$$

$$\sum_{\{l_k : k \in \bar{\mathbb{G}}_T(m)\}} P\left(\bigcap_{k \in \bar{\mathbb{G}}_T(m)} l_k|l_m\right) \prod_{i \in \bar{\mathbb{G}}_T(m)} P\left(\bigcap_{k \in \mathbb{T}_{T_d}(i)} d_k|l_i\right)$$

Note that the set $$\bar{\mathbb{G}}_{T_d}(m) \overset{def}{=} \cup_{k \in \bar{\mathbb{G}}_T(m)} \mathbb{T}_{T_d}(k),$$

which is the set of all nodes with ATR data that are in the sub-trees spanned by $\bar{\mathbb{G}}_T(m)$. A similar definition holds for $\mathbb{G}_{T_d}(m)$. The set of Eqs. (40)-(42) define a recursion on the tree $\mathbb{T}$ that progressively breaks down the set $\mathbb{T}_{T_d}(m)$ into sub-trees $\mathbb{T}_{T_d}(i)$, $i \in \mathbb{C}_T(m)$.

The conditional probability of nodes in the sets $\mathbb{G}_T(m)$ and $\bar{\mathbb{G}}_T(m)$ given node $m$ is required in the above recursion. Since $\mathbb{G}_T(m) \subseteq \mathbb{C}(m)$, the nodes belong to the clique associated with parent node $m$ and the conditional probability for this set can be computed on the same lines as Eq. (9)

$$P\left(\bigcap_{k \in \mathbb{G}_T(m)} l_k|l_m\right) = \quad (43)$$

$$\begin{cases} P(l_i = 1|l_m), & l_i = 1, l_k = 0, \forall k \in \mathbb{G}_T(m), k \neq i \\ 1 - \sum_{i \in \mathbb{G}_T(m)} P(l_i = 1|l_m), & l_k = 0, \forall k \in \mathbb{G}_T(m) \\ 0 & \text{otherwise} \end{cases},$$

For the set $\bar{\mathbb{G}}_T(m)$, the computation is a little more involved and requires first the computation of the conditional probability of the nodes in set $\bar{\mathbb{G}}_T(m) \cup m$ given their parent $j = p(m)$ followed by a subsequent marginalization over $j$, if $j \notin \bar{\mathbb{G}}_T(m)$, $$P\left(\bigcap_{k \in \bar{\mathbb{G}}_T(m)} l_k|l_m\right) = \quad (44)$$

$$\begin{cases} \sum_{l_j} P\left(\bigcap_{k \in \bar{\mathbb{G}}_T(m) \cup m} l_k|l_j\right) P(l_j)/P(l_m) & j \notin \bar{\mathbb{G}}_T(m) \\ P\left(\bigcap_{k \in \bar{\mathbb{G}}_T(m) \cup m, k \neq j} l_k|l_j\right) P(l_j)/P(l_m) & j \in \bar{\mathbb{G}}_T(m) \end{cases}$$

The conditional probability $P(\bigcap_{k \in \bar{\mathbb{G}}_{T(m) \cup m}} l_k|l_j)$ or $P(\bigcap_{k \in \bar{\mathbb{G}}_{T(m) \cup m, k \neq j}} l_k|l_j)$ for the two cases above can be computed on the same lines as Eq. (43).

Algorithm 3 shows the pseudo-code for the complete algorithm. The function FuseData returns the posterior probability of the node given all the data, $P(l_m|\bigcap_{k \in \mathbb{D}} d_k)$, which is a more useful quantity for decision making purposes. The function GetProbOnTree computes the data likelihood on the sub-trees in a recursive fashion. When the sets $\mathbb{G}_T(m)$ and $\bar{\mathbb{G}}_T(m)$ have a cardinality of 1, there is a further simplification that can be performed and this is exploited in the pseudo-code. The set $\mathbb{I}(m)$ collects all single elements from the sets $\mathbb{G}_\mathcal{T}(m)$ and $\bar{\mathbb{G}}_\mathcal{T}(m)$. These children nodes are all independent and the data likelihood on their sub-trees can simply be inferred using the function INFERPROBABILITY. The use of the function INFERPROBABILITY is very powerful as it Formally, the compact tree is obtained by eliminating all nodes i from the full tree such that $i \notin \mathbb{D}$ and the parent of i, k=p(i), has null sets $\mathbb{G}_\mathcal{T}(k) \equiv \emptyset$ and $\bar{\mathbb{G}}_\mathcal{T}(k) \equiv \emptyset$ and only $\mathbb{I}(k) \neq \emptyset$. In the example shown in FIGS. 8A-8D, the node $l_2$ cannot be eliminated even though $2 \notin \mathbb{D}$ since the parent $l_4$ has $\bar{\mathbb{G}}_\mathcal{T}(4) \neq \emptyset$.

---

Algorithm 3 FuseData

```
1:  function FUSEDATA(m, {P(d_k||l_k): k ∈ 𝔻},G)                     Compute P{l_m|∩_k∈𝔻 d_k}
2:      T = CONSTRUCTCOMPACTTREE(m, 𝔻, G)           Tree with root m and paths to nodes i ∈𝔻
3:      P(∩_k ∈ 𝔻 d_k||l_m) = GETPHOBON'TREE(m, (P(d_k||l_k): k ∈ 𝔻}, T, G)
```

4:
$$P\left(l_m \,\Big|\, \bigcap\nolimits_{k \in D} d_k\right) = \frac{P\left(\bigcap\nolimits_{k \in D} d_k | l_m\right) P(l_m)}{\sum\limits_{l_m} P\left(\bigcap\nolimits_{k \in D} d_k | l_m\right) P(l_m)}$$

```
5:      return p(l_m|∩_k∈𝔻 d_k)
6:  end function
7:  function GETPROBONTREE (m > {P(d_k||l_k): k ∈ 𝔻}, T, G)       Compute P(∩_K∈𝔻 D_K|L_{M+L})
8:      {G_𝒯(m), Ġ_𝒯(m), 𝕀(m)} = CONSTRUCTSETS(m, T, G)
9:      if m ∈ 𝔻 then
10:         p(·) = [P(d_m||l_m = 1), p(d_m||l_m = 0)]                 Data available on current node
11:     else
12:         p(·) = [1,1]                                                             Initialize
13:     end if
14:     for n ∈ 𝕀(m) do                                           For all independent children
15:         p_n(·) = GETPROBONTREE(n, {P(d_k||l_k): k ∈ 𝔻}, T, G)
16:         p_m(·) = INFERPROBABILITY(m, n, p_n(·), G)
17:         p(·) ← p(·)p_m(·)
18:     end for
19:     for 𝔾 = {G_𝒯(m), Ġ_𝒯(m)} do              Loop over correlated groups of children
20:         for n ∈ G do
21:             P_n(·) = GETPROBONTREE(n, {P(d_k||l_k): k ∈ 𝔻}, T, G)
22:         end for
23:         Compute P(∩_{n∈G} l_n||l_m) usng Eqs. (43) and (44)
```

24:
$$p_m(l_m) = \sum_{(l_n; n \in G)} P\left(\bigcap\nolimits_{n \in G} l_n | l_m\right) \prod_{n \in G} p_n(l_n)$$

Eqs. (41) Or (42)

```
25:         p(·) ← p(·)p_m(·)
26:     end for
27:     return p(·)
28: end function
29: function CONSTRUCTSETS(m, T, G)
30:     G_𝒯(m) = C_𝒯(m) ∩ ℂ(m)
31:     Ġ_𝒯(m) = C_𝒯(m) \ G_𝒯(m0)
32:     𝕀(m) = ∅                                           Initialize set of independent nodes
33:     If |𝔻_𝒯(m)| = 1 then                                        Only one node in the set
34:         𝕀(m) = 𝕀(m) ∩ 𝔻_𝒯(m)                                              Add to set 𝕀(m)
35:         G_𝒯(m) = ∅                                              Remove node from G_𝒯(m)
36:     end if
37:     If |Ġ_𝒯(m)| = 1 then                                     Only one node in the set?
38:         𝕀(m) = 𝕀(m) ∪ Ġ_𝒯(m)                                             Add to set 𝕀(m)
39:         Ġ_𝒯(m) = ∅                                              Remove node from Ġ_𝒯(m)
40:     end if
41:     return {G,𝔻_𝒯(m), 𝕀(m)}
42: end function
```

Figure 8A:
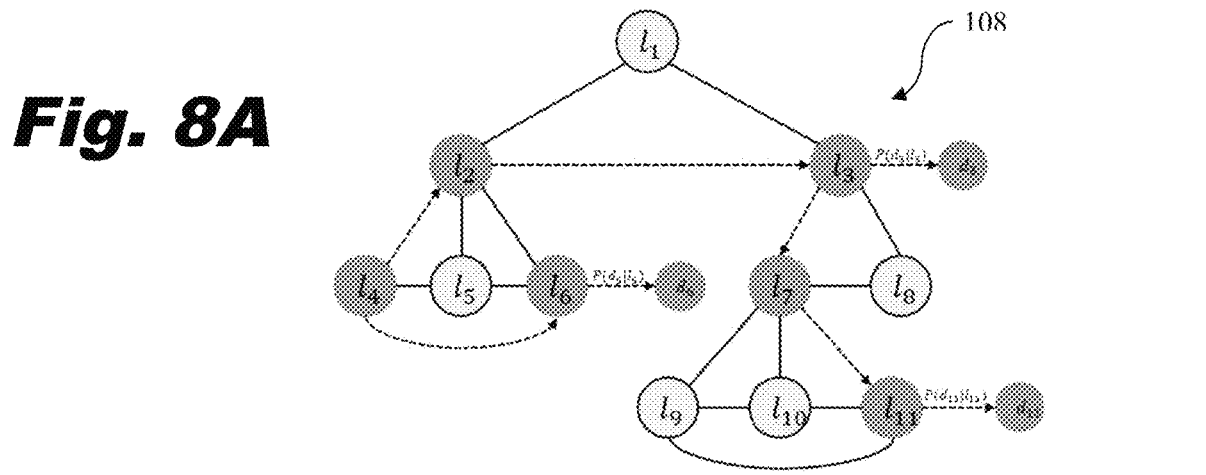
FIG. 8A is the graph of FIG. 5, showing data at nodes $\mathbb{D} = \{3,6,11\}$ and showing the shortest path between node 4 and the data set $\mathbb{D}$.
Figure 8B:
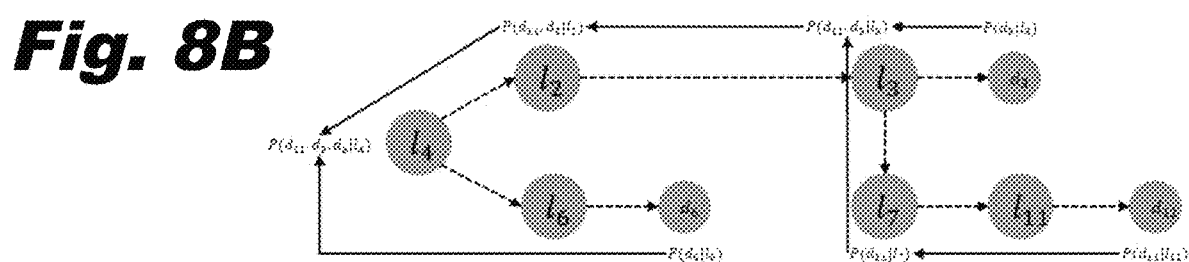
FIG. 8B is a data flow diagram, showing the tree composed from the shortest path and node 4 as the root.
Figure 8C:
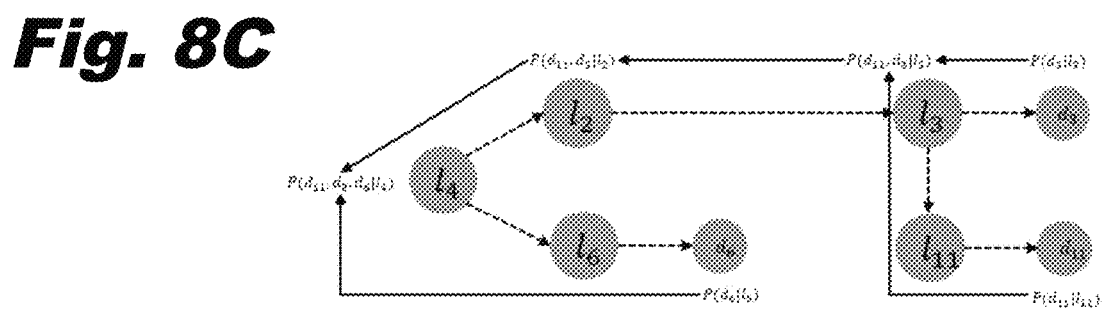
FIG. 8C is a data flow diagram, showing a reduced version of FIG. 8B where node $l_7$ can be removed and inference can be directly done between nodes $l_{11}$ and $l_3$.
Figure 8D:
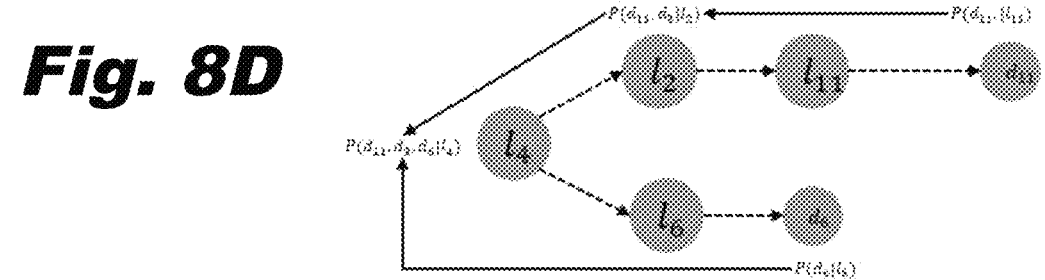
FIG. 8D is a data flow diagram, showing a compact tree when $\mathbb{D} = \{6,11\}$.

--- allows us to make a more compact tree. For example, the node $l_7$ in FIG. 8A has no data associated with it and lies on a linear path between $l_3$ and $l_{11}$. In this case, inference can be performed directly between nodes $l_3$ and $l_{11}$ (case addressed in Sec. 3.2) and node $l_7$ can be eliminated from the tree. FIG. 8C shows such a compact tree for the tree shown in FIG. 8B. Here node $l_7$ can be removed and inference can be directly done between nodes $l_{11}$ and $l_3$. For long linear runs between nodes, this can significantly reduce the size of the tree. FIG. 8D shows the compact tree when $\mathbb{D} = \{6, 11\}$, and the path between $l_2$ and $l_{11}$ can be shorted by removing node $l_3$.

When the function GETPROBONTREE is applied to the node 4 for the tree shown in FIG. 8A, the recursion unfolds in the following fashion:

$$P(d_3, d_6, d_{11}|l_4) = \sum_{l_2, l_6} P(l_2, l_6|l_4) P(d_3, d_{11}|l_2) P(d_6|l_6), \quad \bar{G}_T(4) = \{2, 6\},$$

$$P(d_3, d_{11}|l_2) = \left(\sum_{l_3} P(l_3|l_2) P(d_3, d_{11}|l_3)\right), \quad \mathbb{I}(2) = \{3\},$$

$$P(d_3, d_{11}|l_3) = P(d_3|l_3)\left(\sum_{l_7} P(l_7|l_3) P(d_{11}|l_7)\right), \quad \mathbb{I}(3) = \{7\},$$

-continued $$P(d_{11}|l_7) = \left(\sum_{l_{11}} P(l_{11}|l_7) P(d_{11}|l_{11})\right), \quad \overline{\mathbb{C}}(7) = \{11\},$$

where the computations occurring inside InferProbability are shown in parenthesis. Also, note that only the non-empty sets are listed on the right-hand side and the empty sets are omitted. FIG. 8B illustrates the above computation of all the intermediate data likelihoods using black arrows. As the recursion unfolds, the data likelihoods are propagated from the bottom of the tree towards the top until the root of the tree is reached. The computation on the compact tree remains the same, except the last line corresponding to node $l_7$ is explicitly eliminated from the recursion and farmed out to InferProbability $$P(d_3, d_6, d_{11}|l_4) = \sum_{l_2, l_6} P(l_2, l_6|l_4) P(d_3, d_{11}|l_2) P(d_6|l_6), \quad \overline{\mathbb{C}}_T(4) = \{2, 6\},$$

$$P(d_3, d_{11}|l_2) = \left(\sum_{l_3} P(l_3|l_2) P(d_3, d_{11}|l_3)\right), \quad \overline{\mathbb{C}}(2) = \{3\},$$

$$P(d_3, d_{11}|l_3) =$$

$$P(d_3|l_3)\left(\sum_{l_7} P(l_7|l_3) \sum_{l_{11}} P(l_{11}|l_7) P(d_{11}|l_{11})\right), \quad \overline{\mathbb{C}}(3) = \{7\},$$

The original computation corresponding to node $l_7$ still occurs but without the overhead of the recursion. This savings can become significant if long linear runs are eliminated from the tree. The unfolded recursion for the tree shown in FIG. 8D is $$P(d_3, d_6, d_{11}|l_4) = \sum_{l_2, l_6} P(l_2, l_6|l_4) P(d_{11}|l_2) P(d_6|l_6), \quad \overline{\mathbb{C}}_T(4) = \{2, 6\},$$

$$P(d_{11}|l_2) =$$

$$\left(\sum_{l_3} P(l_3|l_2) \sum_{l_7} P(l_7|l_3) \sum_{l_{11}} P(l_{11}|l_7) P(d_{11}|l_{11})\right), \quad \overline{\mathbb{C}}(2) = \{11\},$$

4 RESULTS

Figure 9A:
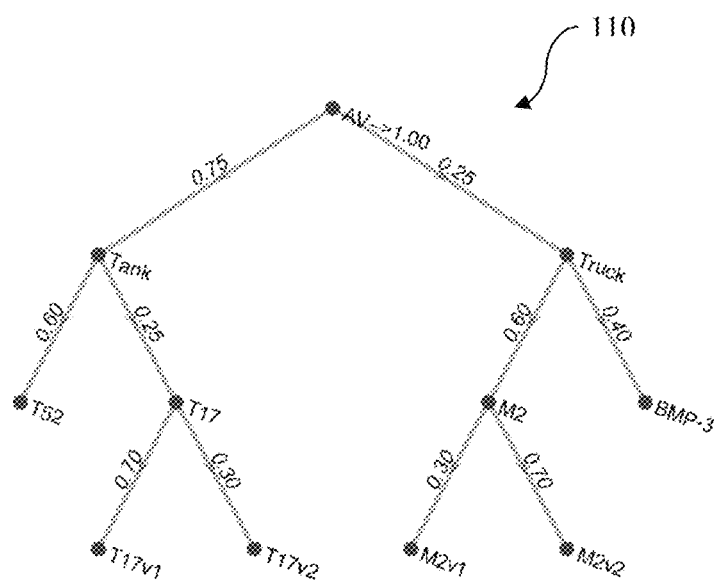
FIG. 9A is an example taxonomic model with user specified parameters.

We formulate a relatively small and simple model to illustrate the algorithms that were developed in this disclosure. FIG. 9A shows the example taxonomy 110 with the user specified parameters. Here the Armored Vehicle (AV) is divided into a Tank and Truck that are further divided into two specific vehicles of each type. A finer sub-division is provided for T17 to represent two different versions: T17v1 and T17v2. Similarly, a finer sub-division is provided for M2 as well. The conditional probability of each category given its parent is provided along with the a priori probability of the root node AV. The label associated with the links represent P(child=1|parent=1) and it is understood that P(child=1|parent=0)=0 from the subset property given in Eq. (11). Note that the probabilities of the children of Tank do not add up to unity implying that there is an implicit "other" category modeling all the other classes not explicitly modeled.

Figure 9B:
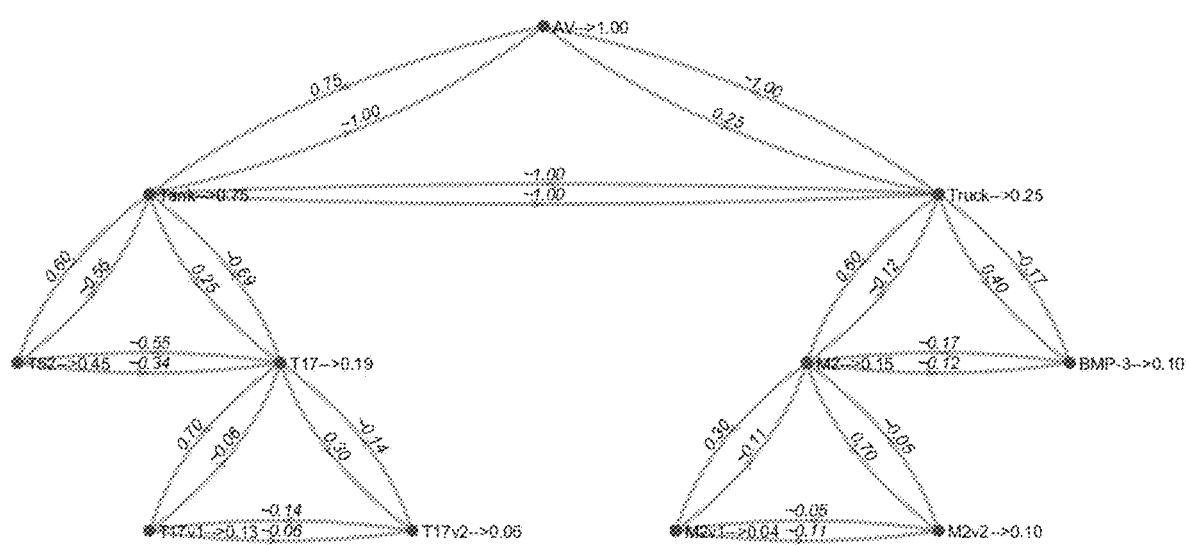
FIG. 9B is the model of FIG. 9A, showing the model fully populated with all a priori and conditional probabilities computed between adjacent nodes.

FIG. 9B shows the fully populated graph after POPULATEGRAPH is called on the root node AV. All the a priori probabilities are computed (shown next to the nodes) as well as the conditional probability for all links between adjacent nodes of the graph. The conditional probability between any two nodes is fully specified by two numbers: P(child=1|parent=1) and P(child=1|parent=0). However, for the sake of brevity, only one of these numbers is specified on the link if the other probability is either 0 or 1. A tilde is used in the label when specifying P(child=1|parent=0) and omitted when specifying P(child=1|parent=1). We see that the a priori probabilities get smaller as we progress from the root node to the leaves. It represents the probability of observing the node when no data has been collected. So for example, there is a 4.5% chance of observing a M2v1 given that 30% of M2s are M2v1s, 60% of Trucks are M2s, and 25% of Trucks are AVs.

Figure 10A:
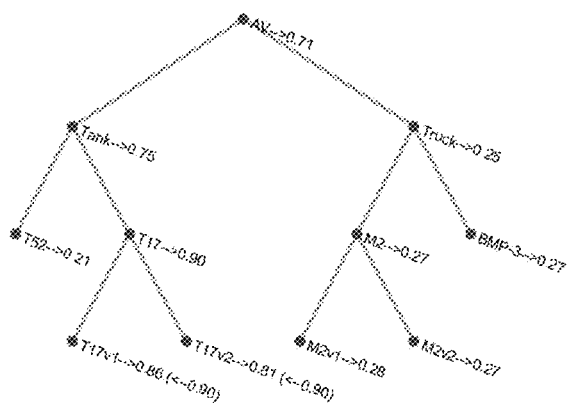
FIG. 10A shows inferred data likelihoods for all the nodes of the example model of 9A when ATR data is received on nodes T17v1 and T17v2.
Figure 10B:
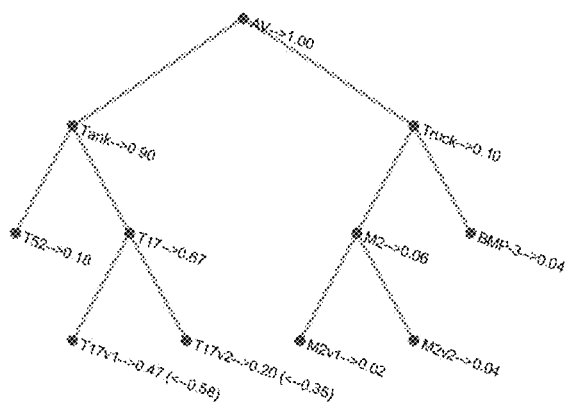
FIG. 10B shows the inferred posterior probabilities for all the nodes of the example model of 9A when ATR data is received on nodes T17v1 and T17v2.

The inference can be done either as data likelihoods or as posterior probabilities after the data is observed. For decision purposes, it is the posterior probability that is more useful as it is properly normalized. However, it is instructive to look at data likelihoods as well to gain an understanding of the workings of the algorithm. FIGS. 10A-10B show the inference performed both in data likelihoods and posterior probabilities in a) and b) respectively. Here we receive two detects from ATR with equal likelihood for T17v1 and T17v2. The ATR data likelihoods are $P(d_1|T17v1=1)=0.9$ and $P(d_2|T17v2=1)=0.9$, where we have normalized the data likelihoods so $P(d_1|T17v1=0)=0.1$ and $P(d_2|T17v2=0)=0.1$. The fused data likelihoods for all the nodes in the taxonomy $P(d_1, d_2|\bullet)$ are shown in FIG. 10A on the nodes with outward pointing arrows. We see that the fused likelihood drops for nodes T17v1 and T17v2 from the measured 0.9. This is because these nodes are mutually exclusive and cannot coexist; a positive result on any of them implies a negative result for the sibling. However, the probability of their parent T17 is reinforced whenever either of the children is observed. In this case, the data likelihood of T17 remains at 0.9 since both of its children are at 0.9. The data likelihoods then reduce as we move away from T17 to the rest of the graph. The data likelihood of Tank has fallen to 0.75 and AV is 0.71. The Truck side of the graph has all low likelihoods around 0.25. This may look counter intuitive as we would have expected the coarser categories that encompass the observed data to have high probability, namely, Tank and AV. However, that intuition really only holds in the posterior domain.

FIG. 10B shows the fused result for the same ATR detects but now as posterior probabilities given by $P(\bullet|d_1, d_2)$. The conversion from data likelihoods to posterior probabilities is governed by the a priori probability of the node as seen from Bayes rule Eq. (32). The posterior probabilities of the raw ATR detects are 0.58 and 0.35 for T17v1 and T17v2 respectively, making T17v1 more probable than T17v2 even though the ATR data likelihoods are the same. The 7:3 ratio in the proportions of T17v1 and T17v2 specified by the user is now reflected in the posterior probabilities.

All the other probabilities in the tree are intuitive as well. The parent probabilities are now the sum of their children probabilities all throughout except for Tank, where the probability of the children did not add up to unity to make room for a "other" class. The probabilities are now increasing as we go to the coarser categories that encompass the data. The probabilities for both T17v1 and T17v2 are reduced from their raw detected values due to their opposing nature. The Truck side of the taxonomy has low probability given that the observed data fell in the Tank side.

Figure 11A:
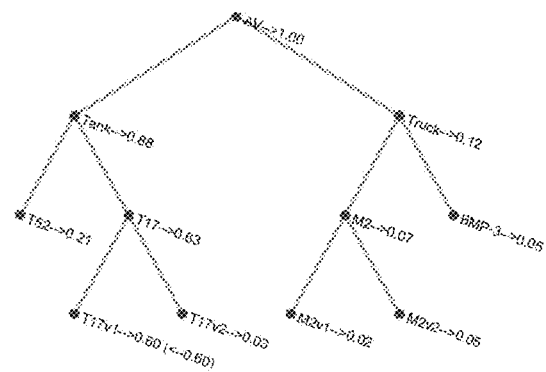
FIGS. 11A-11F show the fused posterior probabilities on all the nodes of the example model of 9A for a number of cases where the number of ATR data points progressively increase going from 1 raw detect in FIG. 11A to 6 raw detects in FIG. 11F.
Figure 11B:
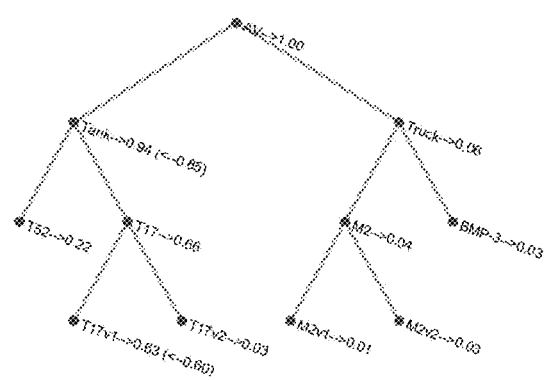
Figure 11C:
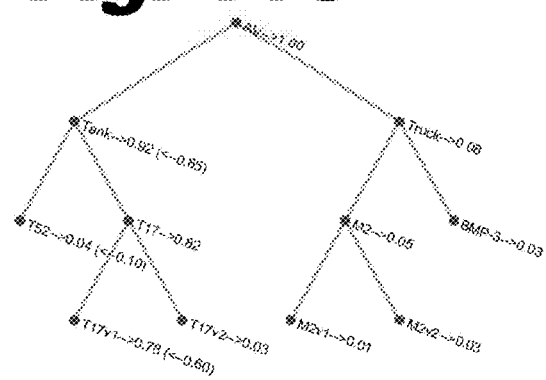
Figure 11D:
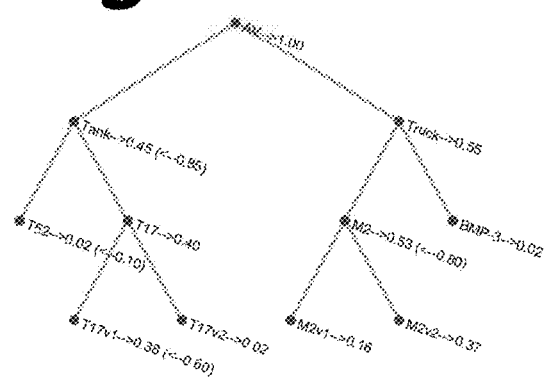
Figure 11E:
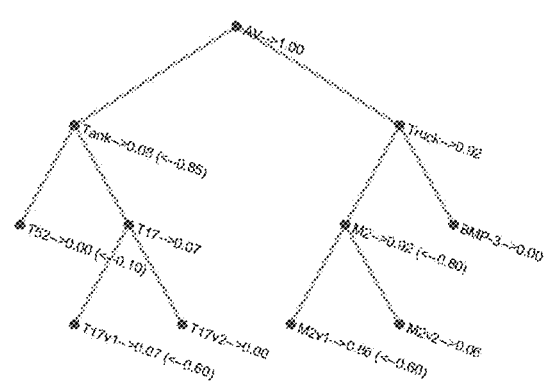
Figure 11F:
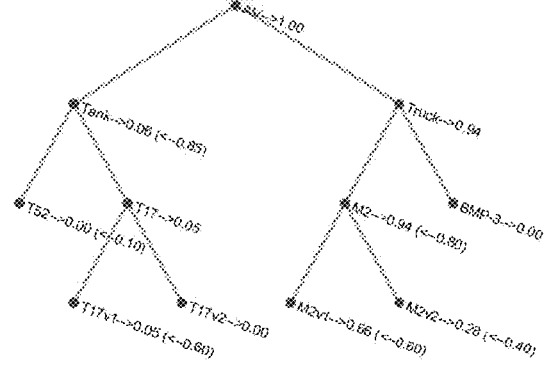
Figure 13:
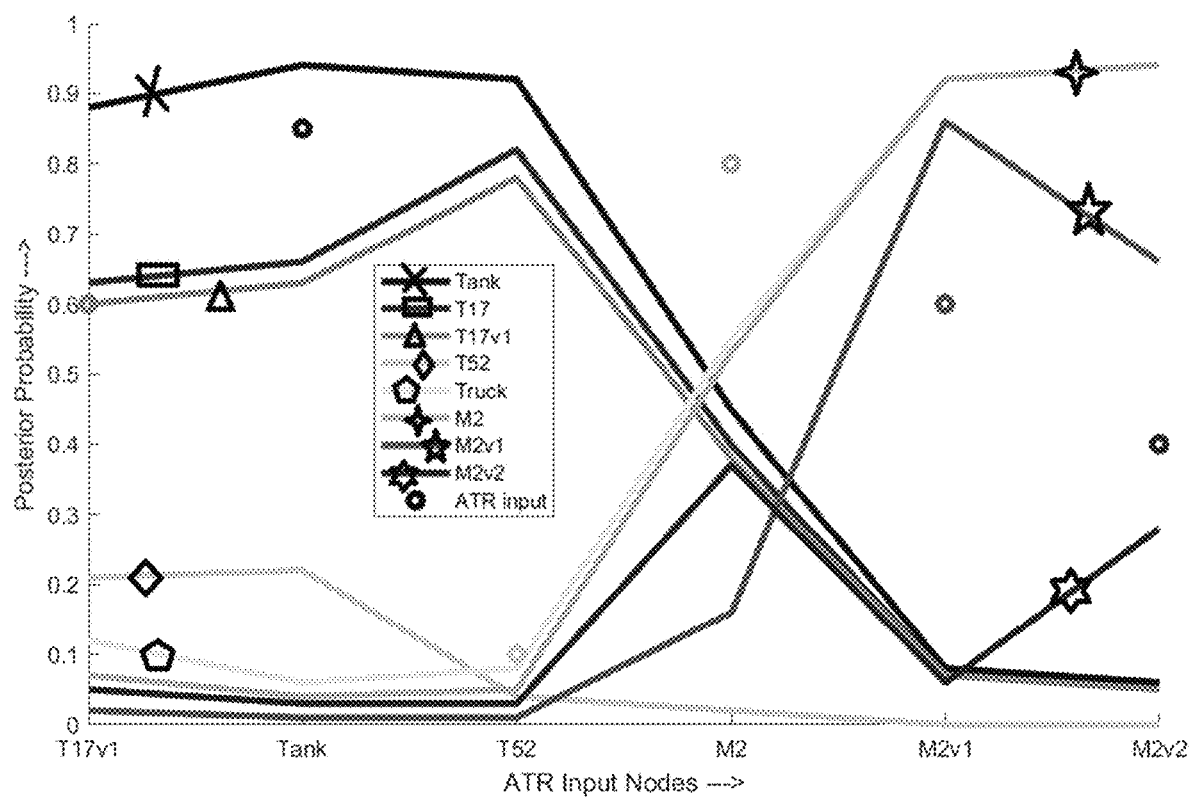
FIG. 13 is a plot of the data of FIG. 12, showing the fused posterior probabilities as lines and input ATR data shown as circles.

For all the subsequent results, we will only show the posterior probability. FIGS. 11A-11F show a number of cases where the number of data points progressively increase going from 1 raw detect in FIG. 11A to 6 raw detects in FIG. 11F. The first detect received in FIG. 11A is for T17v1. There is no fusion in this case. The 0.6 probability for T17v1 becomes 0.63 for T17, 0.88 for Tank. The Truck probability has dropped to 0.12 but not completely ruled out. Similarly, the probability for T52 is 0.21 but not ruled out. Note there was a 60% chance for a T52 given a Tank, so the high probability of Tank keeps this option in play. The second ATR detect received in FIG. 11B is for Tank with probability 0.85. This is consistent with the evidence in FIG. 11A and the probabilities of T17v1, T17, and Tank all rises. Note that the probability of T52 also rises slightly since the additional measurement is directly on the Tank, which raises the probability of both of its children. FIG. 11C adds another ATR detect on T52. This is a negative result on T52 since the data comes in with probability of only 0.1. This data point now helps us pretty much eliminate T52 from consideration as its fused probability drops to 0.04, whereas T17 and in particular T17v1 is increased in probability. The picture that is emerging now is that it is most likely a Tank (0.92) and in particular a T17 (0.82)/T17v1 (0.78). The Truck side of the taxonomy is pretty much ruled out at this point. The new data received in FIG. 11D changes this view dramatically with conflicting data. A raw ATR detect on M2 is received with probability 0.8; it is in the Truck part of the taxonomy that was previously ruled out. Now this side of the taxonomy comes back into play as the probabilities are now divided more or less evenly between Tank and Truck. All the probabilities on the Tank side fall as a consequence and all probabilities on the Truck side rises. The chance of it being an M2 is now 0.53. Note this is considerably lower than the raw detect of 0.8 from the ATR due to the presence of conflicting data from previous collects. The data point received in FIG. 11E bolsters this view further as a raw detect on M2v1 is received with probability 0.6. This tips the balance of the tree towards the Truck side and it is most likely to be a M2/M2v1. The Tank side has become quite improbable. The final detect received in FIG. 11F is on node M2v2 with a probability of 0.4. This helps to increase the probability that it is a Truck/M2 but the probability of M2v1 decreases due to conflicting information. The final view based on evidence suggests that it is most likely a Truck/M2 but a little more ambiguous on whether it is a M2v1 or M2v2 with the data favoring M2v1 over M2v2.

Notice how the tree in FIGS. 11A-11F always remain properly normalized with the parents probability equal to the sum of their modeled children even in the face of conflicting data. This is confirmation that the algorithm is working correctly. In practice, the inferred probability on all the nodes of the tree will never be computed. The user selects a particular node that they are interested in and inference is performed for just that node. This can achieved quickly even if the taxonomy is very large.

For the example shown in FIGS. 11A-11F, FIG. 12 is a table that lists the received ATR data on the top along with the a priori probability of all the nodes for which the data is collected. Both the data likelihood generated by the ATR and the posterior probability for the received data is shown. The bottom part of the table lists the inferred posterior probability of select nodes in the taxonomy as each data point is received. The same data is also plotted in FIG. 13. All the data points are plotted in posterior space. The input ATR data are shown as circles. We see that if a positive result is received for any node, it tends to pull up the probability for all nodes on that side other than the ones that are directly conflicting with that measurement. The left half of the plot shows that the evidence points to the object in the Tank side of the taxonomy. The right half shows that the subsequent data overrides this conclusion and favors the Truck side more after data is received for nodes in the part of the graph.

Figure 15:
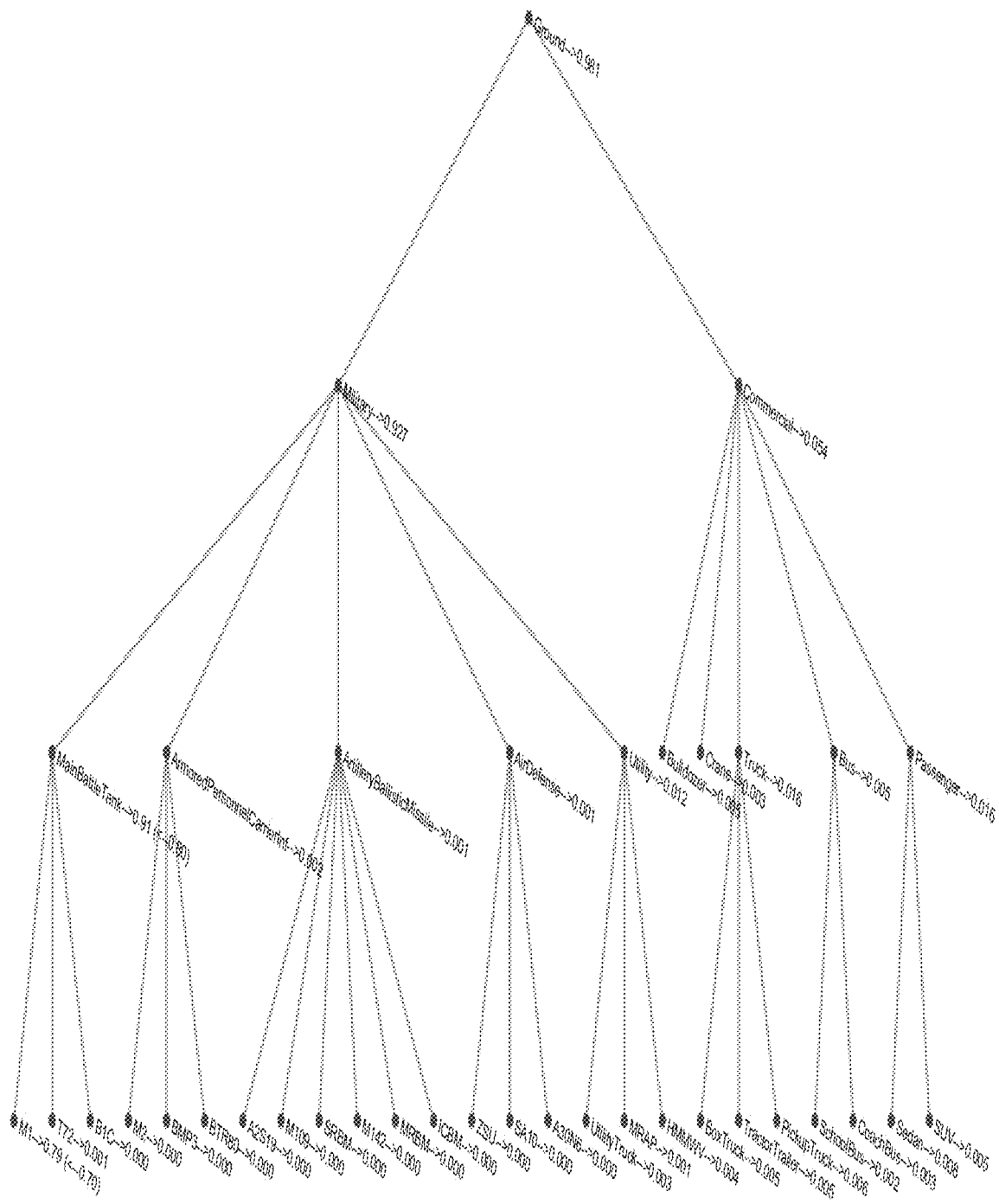
FIG. 15 is the taxonomy of FIG. 14, showing inferred posterior probabilities on all the nodes when ATR data is received for nodes M1 and MainBattleTank.
Figure 16:
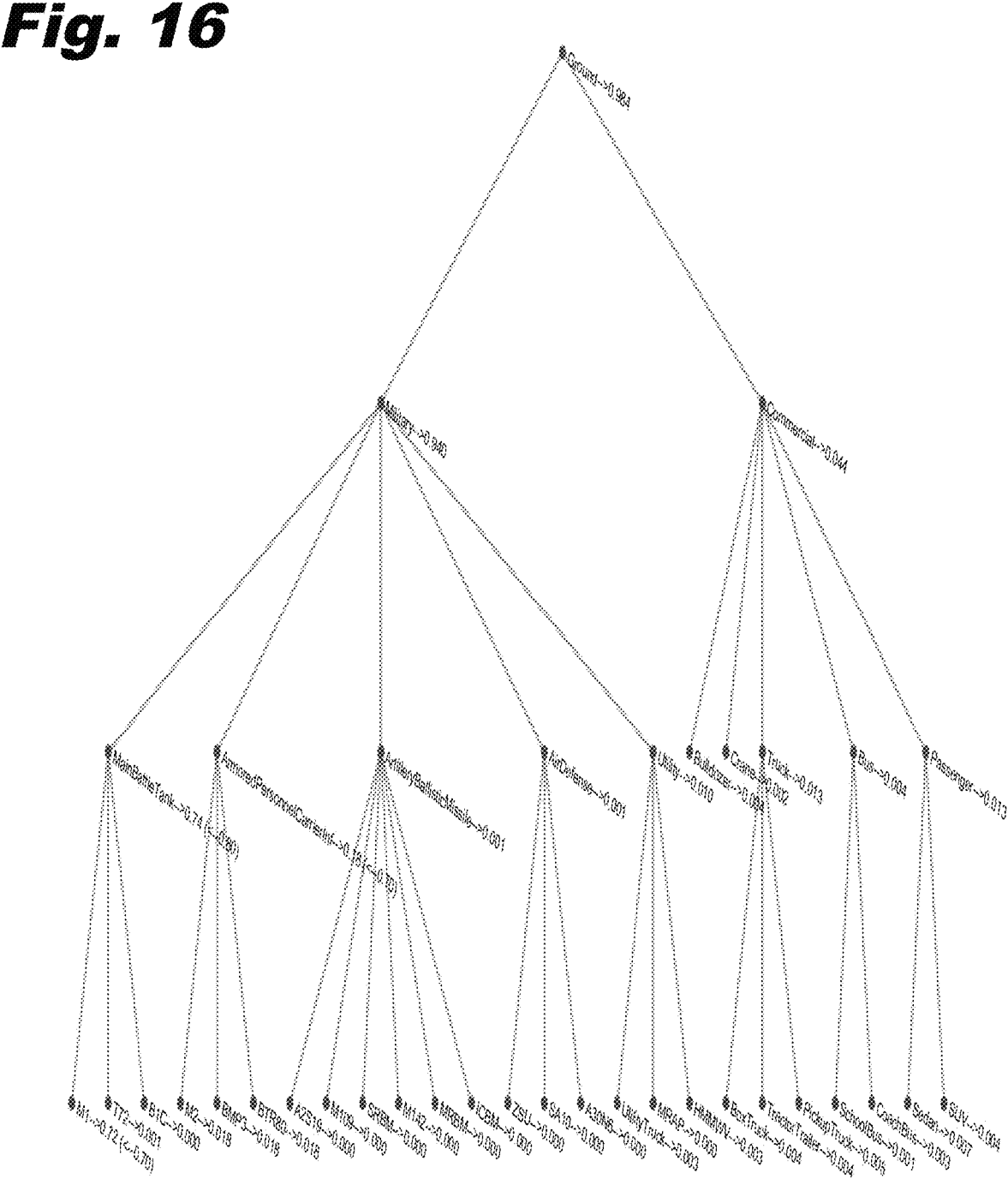
FIG. 16 is the taxonomy of FIG. 14, showing inferred posterior probabilities on all the nodes when the data in FIG. 15 is augmented with another ATR detect received on ArmoredPersonnelCarrier.

A more realistic taxonomy 112 is shown in FIG. 14 along with all the model parameters and inferred a priori probabilities on all the nodes. Note that the a priori probabilities are tiny on the leaf nodes, which means the chances of observing any of these labels is slim. This is a direct consequence of the number of levels in the taxonomy and the number of children for each parent node. Additionally, the percent occurrence for the children do not sum to 100%/a in most cases leaving a large fraction of the child nodes as unmodeled further reducing the chances of observing the modeled nodes. FIG. 15 shows the inferred posterior probability on the tree when ATR detects on M1 and MainBattle-Tank are received. The input probabilities are again shown as inwards pointing arrows on the nodes and the inferred results are shown with outward pointing arrows. These two detects both reinforce each other and the inferred probabilities are higher for both these nodes. The commercial side that was more likely a priori has now been pretty much ruled out. FIG. 16 shows updated results when another ATR hit comes in on node ArmoredPersonnelCarrier. This is conflicting information that brings down the probabilities of all the nodes on which data is collected. Note that the Military node is reinforced as the additional data is still consistent with the object being a military vehicle.

4.1 Practical Considerations

If the number of hierarchical levels in a taxonomy are large and/or there are a large number of children for any one node, the a priori probability of a node may get tiny. The model is encoding the fact that in the absence of data, it may be very unlikely to observe a particular label on the finer levels of the taxonomy. This a priori belief acts as a bias and it takes an overwhelming amount of evidence to overcome it. For example, the a priori probability of node M2v2 in the example of FIGS. 9A-9B is 0.105. As seen in last column of FIG. 12, we see that the incoming data likelihood of 0.85, which is considered high is converted to a posterior probability of 0.4, which is low. However, we do require the a priori probability as deduced by the model for all the inference performed in the taxonomy to stay consistent in the data likelihood and posterior domain.

One solution is stay all through out in the data likelihood domain. The data fusion as given by Eq. (40) occurs in the likelihood domain and so there is no need to go back to the posterior probability and the a priori probabilities are never explicitly used. However, we saw that the data likelihoods are not normalized properly and do not make much intuitive sense.

A better solution is to use a non-informative prior, i.e., $P(l=1)=0.5$, to convert ATR detects to the posterior domain initially. In this case, the posterior probability of an ATR detect remains the same as the data likelihood generated by the ATR, $P(l|d)=P(d|l)$, and we introduce no bias. All the inference computation in the taxonomy is then done in the posterior domain. When conversion is necessary to the data likelihood domain for fusing multiple detects, the a priori probability of the model is employed. This works reasonably well and yields intuitive results. The computation remain invariant whether done in the likelihood or the posterior domain as long as the model a priori probabilities are employed subsequently. The net effect of this method is that the raw data likelihoods received from the ATR end up getting modified since the initial conversion to the posterior probability uses a non-informative prior whereas the subsequent conversions back to likelihood domain use the actual model a priori probabilities. Note that the data shown in FIG. 14 corresponds to this method if the ATR data in the posterior domain shown in row P(Input node=1|d) was really the data likelihood supplied by the ATR. Interpreting it to be in the posterior domain implicitly assumes the non-informative prior.

If the a priori probabilities are really tiny, the above method (interpreting the received data likelihoods from the ATR as posterior probabilities) becomes very sensitive to input evidence and small increases in detection probability tends to peg the object with very high confidence. This is due to the conversion to the likelihood domain for fusion using the model's tiny a priori probabilities. One way to address this problem is to use a a priori probability that is higher than the model computed a priori probability when it is tiny. Note that any inferred result from the model still uses the model a priori probability for conversion and this exception is only made for received data. However, using altered values of the a priori probability for the raw data makes the result dependent on whether it is computed in the likelihood or the posterior domain. For example, working exclusively in the likelihood domain and then converting the final result to the posterior domain at the very end will give a different result than working primarily in the posterior domain (with switchbacks to the likelihood domain for fusion). We find the latter to work better in practice and yields more intuitive results.

As pointed out earlier, the example in FIG. 14 has tiny a priori probabilities and it would take an overwhelming amount of evidence to overcome it. The method outlined above is employed for the results shown in FIGS. 15 and 16. All the ATR detects are assumed to be received in the posterior domain. Then the conversion within the algorithm to the likelihood domain uses a different a priori probability based on the level of the tree. The "classification" layer or the penultimate layer of the tree employs the non-informative prior to convert to the likelihood domain while the "identification" layer (leaf nodes) uses the prior of the parents (0.5) times the fraction of occurrence for that particular node. For example, node M1 has a fractional occurrence rate of 0.1 given MainBattleTank and therefore will use a prior of 0.5*0.1=0.05 instead of the model computed a priori probability of 0.002.

5 CONCLUSION

Target taxonomies have been used in the past to hierarchically organize objects into classes based on functionality and similarity in features. These classes can also be labels that are assigned by ATR algorithms to objects in sensed data. Depending on the resolution and SNR of the sensed data and the level of fine details that can be discerned, an ATR may assign labels from different levels of the taxonomy to the same physical object. There is value in fusing the data for these different labels if it indeed corresponds to the same physical object. The uncertainty inherent in any individual ATR detect can be beaten down by fusing independent detects and a larger set of target attributes can be inferred by merging ATR detects from different modalities.

In this disclosure, we modeled the labels as binary random variables and showed that the graphical structure of the taxonomy can be used to formulate a compact parameterization of the model. In particular, the labels were modeled as a Markov Random Field (MRF) on the undirected graph derived from the hierarchical structure of the taxonomy. Unlike a Bayesian network, the children of any node in the graph are all dependent on each other in our framework to capture the mutually exclusive property of the children. The constraints imposed by the MRF and mutual exclusivity of the children nodes were primary drivers that allowed the joint relationship of n nodes in a taxonomy to be specified with just n parameters.

Using this model formulation, we derived very efficient recursive algorithms for inference and data fusion. We showed that the posterior probability of any label in the taxonomy can be computed with $\mathcal{O}(n)$ operations, where n is the length of the path between the detected label and the desired label. The complexity therefore scales linearly with the number of edges between the detected and desired label. Similarly, for multiple ATR inputs, the complexity scales linearly with the number of edges in the tree formed with the desired label at the root and shortest path to all the ATR inputs as its branches. The efficiencies were realized by pre-computing certain properties of the graph and storing them for future use.

Finally, it was shown that the parameters of the label model can be estimated by simply counting number of the objects of a particular label in a theater of operation. Online learning and adaptation of the model in the field is also possible if feedback is provided on the fused and inferred results. This makes it possible to evolve the label model over time as more ground truth data is made available improving the performance in the field.

Figure 17:
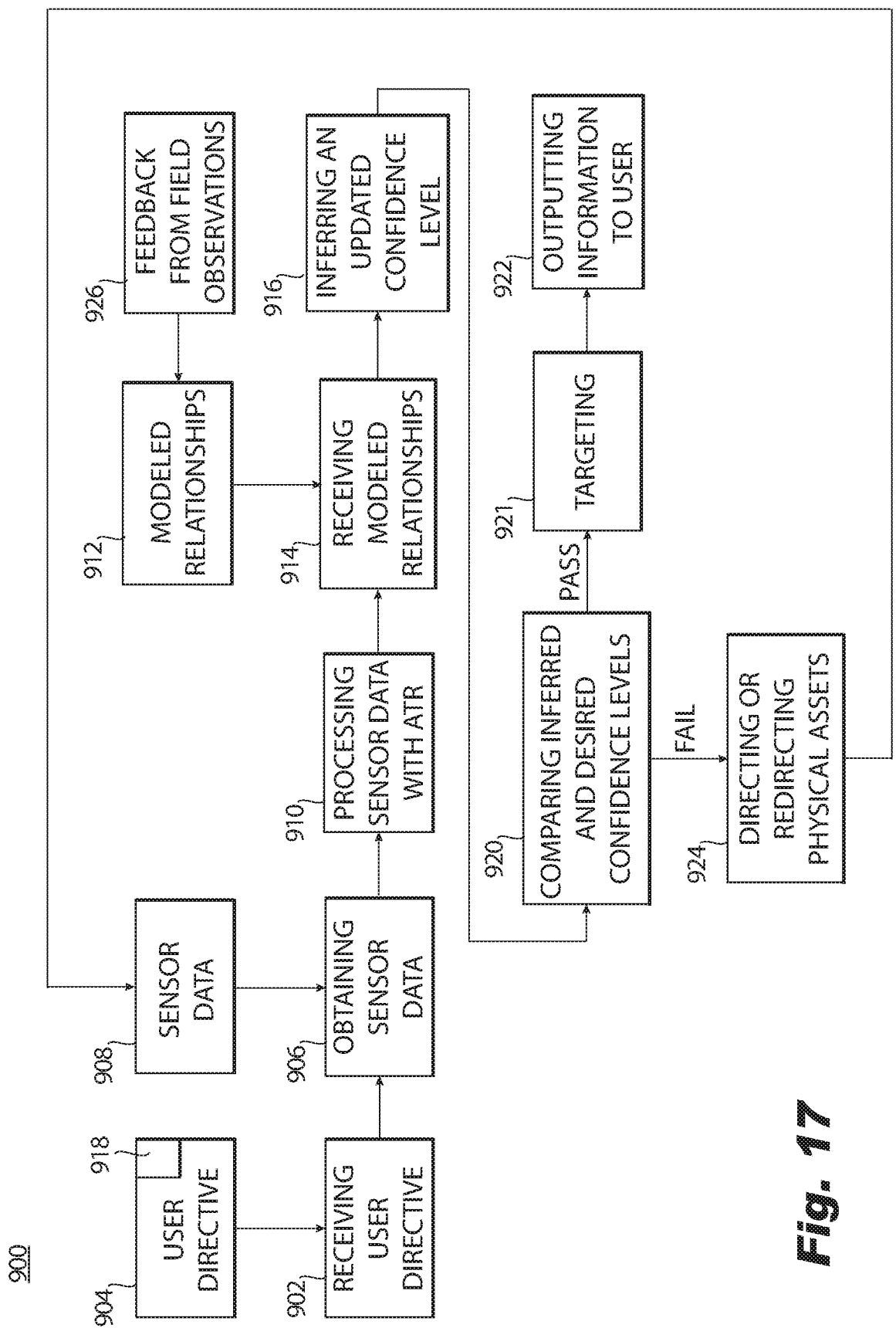
FIG. 17 is a schematic view of a method in accordance with the present disclosure.
Figure 18:
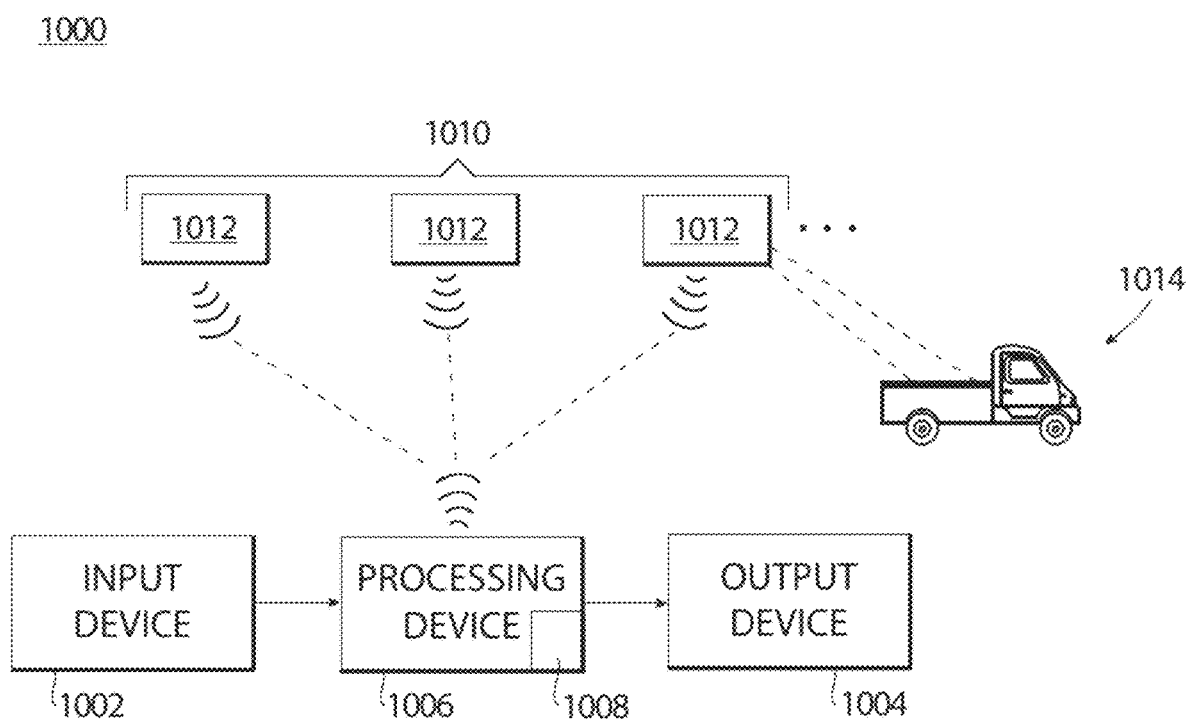
FIG. 18 is a schematic view of a system in accordance with the present disclosure.

With reference now to FIG. 17, a method 900 includes receiving (indicated with box 902) a directive 904 from a user to find an object in a geographical area, wherein the object is identified with an input label selected from a set of labels as explained above. The method 900 includes obtaining (indicated with box 906) sensor data 908 in response to the directive 904 for a real world physical object in the geographical area using one or more sensors. As indicated with box 910, the method 900 includes processing the sensor data with a plurality of automatic target recognition (ATR) algorithms to assign a respective ATR label from the set of labels and a respective confidence level to the real world physical object. The model 900 includes receiving (indicated with box 914) modeled relationships (912) within the set of labels using a probabilistic model based on a priori knowledge encoded in a set of model parameters. The method includes inferring (indicated with box 916) an updated confidence level that the real world physical object actually corresponds to the input label based on the ATR labels and confidences and based on the probabilistic model.

The directive 904 can include a desired confidence level 918 for the input label and the method 900 can include comparing (indicated with box 920) the desired confidence level 918 to the updated confidence level. In the event that the updated confidence level is at or above the desired confidence level, the method 900 can include outputting (indicated with box 922) information on the output device to the user indicative of the updated confidence level, and any relevant information regarding the object in the directive 918. In the event that the updated confidence level is below the desired confidence level, the method can include directing or redirecting (indicated with box 924) one or more physical assets to obtain further sensor data 906 of the real world physical object. Obtaining 906, processing 910, receiving modeled relationships 914, and directing or redirecting 924 can be performed by a non-human system 1000 (shown in FIG. 18) to assist a human analyst. Directing or redirecting 924 one or more physical assets can include surveillance activities such as following movement of the real world physical object, e.g., with an aircraft. Directing or redirecting 924 one or more physical assets can include moving an imaging device on a gimbal, routing an aircraft, moving a forward observer on the ground, and/or routing or controlling a space borne sensor system. Besides directing or redirecting 924 one or more physical assets, the method 900 can include targeting (indicated by box 921) the real world physical object, e.g., with a munition if the pass condition is met at box 920.

Modeling as in modeled relationships 912 can include transforming a taxonomy tree of the set of labels into a complete graph (as described above) with forward and reverse links between siblings and parents in the taxonomy tree. Inferring 916 can include forming a reduced tree with the input label as a root and including all the ATR labels stemming from the root and intervening labels from the complete graph that are along the shortest paths between the respective ATR labels and the input label on the complete graph, as described above. Inferring 916 the updated confidence of the input label can be obtained recursively by traversing the respective shortest paths from the ATR labels to the input label and wherein the confidences of all the intermediate labels in each shortest respective path are computed, as described above.

The method 900 can include updating the set of model parameters based on feedback 926 received from field observations to improve prediction capabilities. The set of model parameters can be computed using relative abundances of objects corresponding to the set of labels in a given geography. Obtaining sensor data 906 can include obtaining sensor data that pre-existed the directive 904, e.g., no new images necessarily need be obtained in response to the directive 904 if recent images are available for the desired geographic region of interest. It is also contemplated that obtaining sensor data 906 can include obtaining sensor data that did not pre-exist the directive, e.g., if recent images are not available, obtaining sensor data 906 can include directing physical assets to obtain new images or data. It is contemplated that there can be more than one instance of the real world physical object in the geographical area and in the sensor data, wherein processing, modeling, and inferring are performed for each instance of the real world physical object. The probabilistic model can be a Markov Random Field (MRF). The modeled relationships within the set of labels using a probabilistic model can be established a priori before receiving the directive from the user.

With reference now to FIG. 18, the system 1000 includes an input device 1002, which can include any suitable device for user input such as a mouse, keyboard, touch screen, voice recognition system, pen and tablet input, virtual reality system, gesture activated system, or the like, and an output device 1004, which can include any suitable device for outputting information to a user such as a display screen, speaker, tactile or force feedback, virtual reality display, printer or the like. A processing device 1006, such as a computer, network of computers, or the like, is operatively connected to receive input form the input device 1002 and to provide output on the output device 1004. The system 1000 also includes machine readable instructions 1008, e.g., encoded in a physical medium such as a memory, disc, solid state storage, or the like, in the processing device 1006 configured to cause the processing device to perform a method 900 as disclosed above including receiving input on the input device 1002 including a directive 918 (identified in FIG. 17) from a user as explained above and outputting information on the output device to the user indicative of the updated confidence level.

The processing device 1006 can be operatively connected to a network 1010 of physical assets 1012, wherein the directive 904 (of FIG. 17) includes a desired confidence level for the input label and wherein the machine readable instructions 1008 further cause the processing device 1006 to compare the desired confidence level to the updated confidence level, and in the event that the updated confidence level is below the desired confidence level, direct or redirect one or more of the physical assets 1012 to obtain further sensor data of the real world physical object 1014.

The methods and systems of the present disclosure, as described above and shown in the drawings, provide for target identification with superior properties including increased confidence levels on ATR and decreased load on human analysts. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
receiving a directive from a user to find an object in a geographical area, wherein the object is identified with an input label selected from a set of labels;
obtaining sensor data in response to the directive for a real world physical object in the geographical area using one or more sensors;
processing the sensor data with a plurality of automatic target recognition (ATR) algorithms to assign a respective ATR label from the set of labels and a respective confidence level to the real world physical object;
receiving modeled relationships within the set of labels using a probabilistic model based on a priori knowledge encoded in a set of model parameters; and
wherein, said modeling includes transforming a taxonomy tree of the set of labels into a complete graph with forward and reverse links between siblings and parents in the taxonomy tree; and
inferring an updated confidence level that the real world physical object actually corresponds to the input label based on the ATR labels and confidences and based on the probabilistic model.

2. The method as recited in claim 1, wherein the directive includes a desired confidence level for the input label and further comprising:
comparing the desired confidence level to the updated confidence level.

3. The method as recited in claim 2, in the event that the updated confidence level is below the desired confidence level, further comprising directing or redirecting one or more physical assets to obtain further sensor data of the real world physical object.

4. The method as recited in claim 3, wherein obtaining, processing, receiving modeled relationships, and directing or redirecting are performed by a non-human system to assist a human analyst.

5. The method as recited in claim 3, wherein directing or redirecting one or more physical assets includes surveillance activities such as following movement of the real world physical object.

6. The method as recited in claim 3, wherein directing or redirecting one or more physical assets includes moving an imaging device on a gimbal, routing an aircraft, moving a forward observer on the ground, and/or routing or controlling a space borne sensor system.

7. The method as recited in claim 2, in the event that the updated confidence level is above the desired confidence level, further comprising targeting the real world physical object with a munition.

8. The method as recited in claim 1, wherein inferring includes forming a reduced tree with the input label as a root and including all the ATR labels stemming from the root and intervening labels from the complete graph that are along the shortest paths between the respective ATR labels and the input label on the complete graph.

9. The method as recited in claim 8, wherein inferring the updated confidence of the input label is obtained recursively by traversing the respective shortest paths from the ATR labels to the input label and wherein the confidences of all the intermediate labels in each shortest respective path are computed.

10. The method as recited in claim 1, further comprising updating the set of model parameters based on feedback received from field observations to improve prediction capabilities.

11. The method as recited in claim 1, wherein the set of model parameters are computed using relative abundances of objects corresponding to the set of labels in a given geography.

12. The method as recited in claim 1, wherein obtaining sensor data includes obtaining sensor data that pre-existed the directive.

13. The method as recited in claim 1, wherein obtaining sensor data includes obtaining sensor data that did not pre-exist the directive.

14. The method as recited in claim 1, wherein there are more than one instance of the real world physical object in the geographical area and in the sensor data, and wherein processing, modeling, and inferring are performed for each instance of the real world physical object.

15. The method as recited in claim 1, wherein the probabilistic model is a Markov Random Field (MRF).

16. The method as recited in claim 1, wherein the modeled relationships within the set of labels using a probabilistic model are established apriori before receiving the directive from the user.

17. A system comprising:
an input device,
an output device, and
a processing device operatively connected to receive input form the input device and to provide output on the output device; and
machine readable instructions in the processing device configured to cause the processing device to:
receive input on the input device including a directive from a user to find an object in a geographical area, wherein the object is identified with an input label selected from a set of labels;
obtain sensor data in response to the directive for a real world physical object in the geographical area using one or more sensors;
process the sensor data with a plurality of automatic target recognition (ATR) algorithms to assign a respective ATR label from the set of labels and a respective confidence level to the real world physical object;
receive modeled relationships within the set of labels using a probabilistic model based on a priori knowledge encoded in a set of model parameters;
wherein, said modeling includes transforming a taxonomy tree of the set of labels into a complete graph with forward and reverse links between siblings and parents in the taxonomy tree; and
infer an updated confidence level that the real world physical object actually corresponds to the input label based on the ATR labels and confidences and based on the probabilistic model; and
output information on the output device to the user indicative of the updated confidence level.

18. The system as recited in claim 17, wherein the processing device is operatively connected to a network of physical assets, wherein the directive includes a desired confidence level for the input label and wherein the machine readable instructions further cause the processing device to
compare the desired confidence level to the updated confidence level; and
in the event that the updated confidence level is below the desired confidence level, direct or redirect one or more of the physical assets to obtain further sensor data of the real world physical object.

19. The system as recited in claim 18, wherein obtaining, processing, receiving model relationships, and directing or redirecting are performed by a non-human system to assist a human analyst.

* * * * *